(12) United States Patent
Harkins

(10) Patent No.: US 6,775,827 B1
(45) Date of Patent: Aug. 10, 2004

(54) REAL-TIME PROGRAM AUDIT SOFTWARE

(75) Inventor: Paul H. Harkins, West Chester, PA (US)

(73) Assignee: Harkins Audit Software, Inc., West Chester, PA (US)

(*) Notice: Subject to any disclaimer, the term of this patent is extended or adjusted under 35 U.S.C. 154(b) by 377 days.

(21) Appl. No.: 09/611,210

(22) Filed: Jul. 6, 2000

Related U.S. Application Data

(63) Continuation-in-part of application No. 09/398,310, filed on Sep. 20, 1999, now abandoned.

(51) Int. Cl.$^7$ ................................................. G06F 9/44
(52) U.S. Cl. ....................................... 717/130; 717/128
(58) Field of Search ................................. 717/127, 130, 717/128, 145

(56) References Cited

U.S. PATENT DOCUMENTS

| | | | |
|---|---|---|---|
| 5,559,884 A | | 9/1996 | Davidson et al. ............... 380/4 |
| 5,574,898 A | | 11/1996 | Leblang et al. ............. 395/601 |
| 5,613,118 A | * | 3/1997 | Heisch et al. ................ 717/158 |
| 5,754,763 A | | 5/1998 | Bereiter .................. 395/187.01 |
| 5,771,385 A | | 6/1998 | Harper |
| 5,794,252 A | | 8/1998 | Bailey et al. ................ 707/202 |
| 5,813,009 A | | 9/1998 | Johnson et al. ............. 707/100 |
| 5,832,271 A | * | 11/1998 | Devanbu ..................... 717/131 |
| 5,903,730 A | * | 5/1999 | Asai et al. ................... 709/224 |
| 5,950,003 A | * | 9/1999 | Kaneshiro et al. ........... 717/130 |
| 6,011,920 A | | 1/2000 | Edwards et al. |
| 6,071,316 A | | 6/2000 | Goossen et al. |
| 6,202,199 B1 | * | 3/2001 | Wygodny et al. ............ 717/125 |

FOREIGN PATENT DOCUMENTS

WO    WO 93/01550    1/1993

* cited by examiner

Primary Examiner—Todd Ingberg
Assistant Examiner—Eric B. Kiss
(74) Attorney, Agent, or Firm—Akin Gump Strauss Hauer & Feld, LLP

(57) ABSTRACT

An automated computer-implemented method for generating an audit record of a computer program while the computer program is executing. The computer program has a source program comprising a plurality of source statements written in a predetermined source language. The method includes the steps of: selecting one or more audit options, each audit option being defined by one or more field names; examining each one of the source statements for the presence of one or more of the field names; creating an audit statement in the source language of the computer program corresponding to each one of the source statements in which one or more of the field names is present; and inserting each created audit statement into the source program proximate to the corresponding source statement to form an expanded source program.

31 Claims, 32 Drawing Sheets

Microfiche Appendix Included
(2 Microfiche, 188 Pages)

```
┌─────────────────────────────────────────────────────────┐
│      Read and store the selected audit compile options  │
│ for the program which were created by the previous      │
│ program. Additional information for the expansion of    │
│         the conventional source program   is            │
│              stored in the Audit Operation Code         │
│         Profiles and Master information    files.       │
└─────────────────────────────────────────────────────────┘
                            │
                            ▼  201
┌─────────────────────────────────────────────────────────┐
│      Read and store the program file information,       │
│    Key fields information, and field cross reference    │
│            information for the program which            │
│          were created by the previous program           │
└─────────────────────────────────────────────────────────┘
                            │
                            ▼  202
┌─────────────────────────────────────────────────────────┐
│      Read the conventional (existing) source statements │
│       for the program from the conventional source      │
│    program library.  In a single pass of the conventional│
│        source program statements, expand the source     │
│         by inserting the basic audit source statements, │
│           and expanded documentation statements.        │
└─────────────────────────────────────────────────────────┘
                            │
                            ▼  203
┌─────────────────────────────────────────────────────────┐
│         If expanded documentation is selected;          │
│   For each file used in the program, document the file by│
│        creating comment lines with the full file name,  │
│     and list the file field names as used in the file key.│
│          Note - Auditing may be limited to only         │
│      expanded source program documentation, if desired. │
└─────────────────────────────────────────────────────────┘
                            │
                            ▼  204
                          (9B)
```

*Fig. 9A*

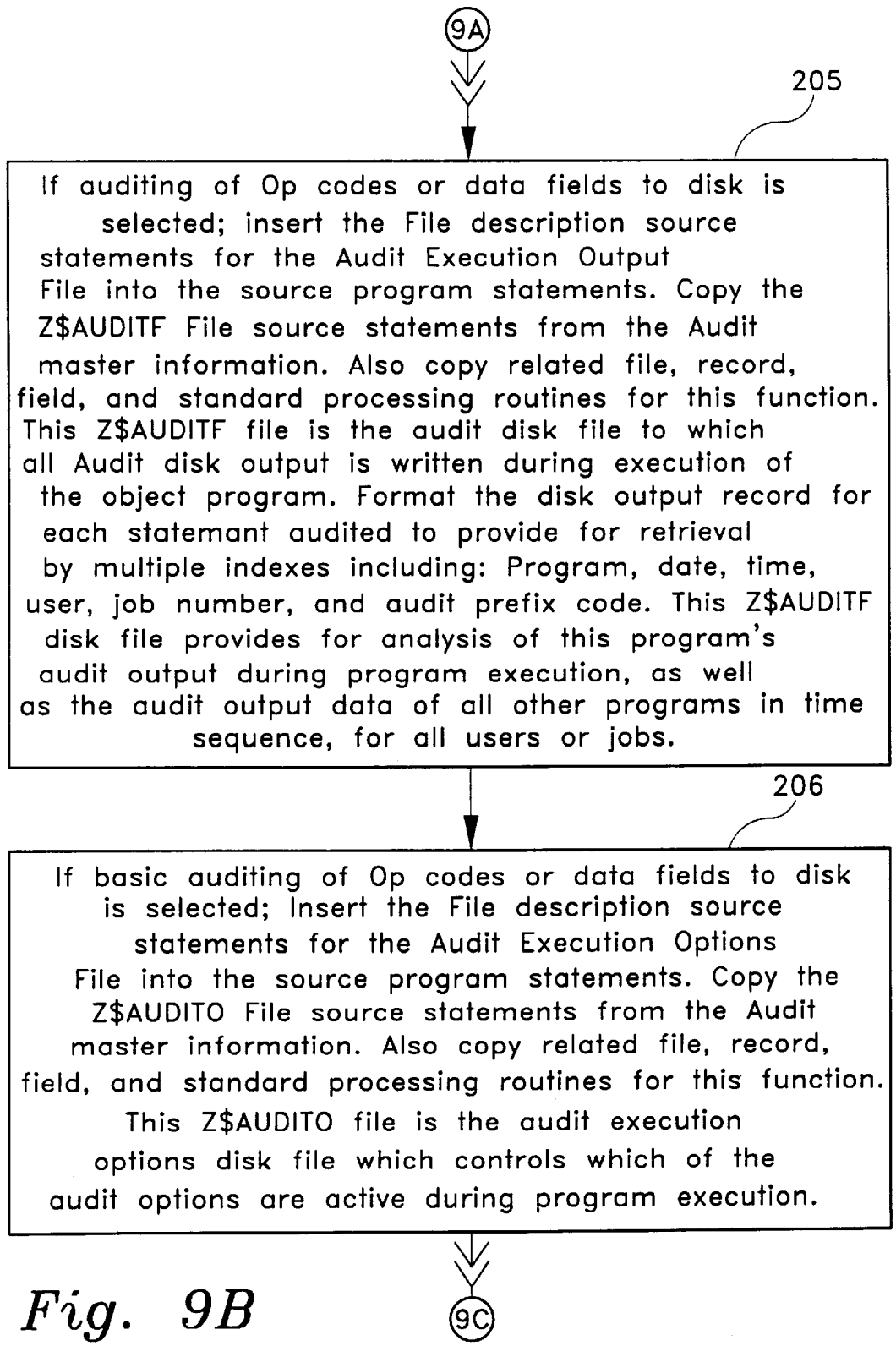

205: If auditing of Op codes or data fields to disk is selected; insert the File description source statements for the Audit Execution Output File into the source program statements. Copy the Z$AUDITF File source statements from the Audit master information. Also copy related file, record, field, and standard processing routines for this function. This Z$AUDITF file is the audit disk file to which all Audit disk output is written during execution of the object program. Format the disk output record for each statemant audited to provide for retrieval by multiple indexes including: Program, date, time, user, job number, and audit prefix code. This Z$AUDITF disk file provides for analysis of this program's audit output during program execution, as well as the audit output data of all other programs in time sequence, for all users or jobs.

206: If basic auditing of Op codes or data fields to disk is selected; Insert the File description source statements for the Audit Execution Options File into the source program statements. Copy the Z$AUDITO File source statements from the Audit master information. Also copy related file, record, field, and standard processing routines for this function. This Z$AUDITO file is the audit execution options disk file which controls which of the audit options are active during program execution.

For each source statement to be expanded with audit statements; Generate a unique audit name for the audited source statement. Utilize the assigned three (3) character audit prefix code for the Op code from the previous program, such as Z$R for read and Z$W for Write. Suffix the audit prefix code with a three digit sequential number, from 001 through 999 each time the Op code is used in the source program. Z$R001 is the first read statement found in the source program, followed by Z$R002 for the second read statement. This uniquely identifies every source statement audited during program execution, and the audited variable names identify the data being processed.

There should be no change to the conventional (existing) source statements. The only exception is if a branch is made to a statement label, and auditing is selected to audit the branch to that label. In that case an audit statement will be inserted at the label statement

Display the initial screen and allow the
program name to be entered
Note — This program is utilized to
input previously expanded source programs
and allow the removal of
all or selected audit source statements. This allows
the complete undoing of the expanded source audit
statements back to the original conventional
input source program, or the partial undoing of the
expanded source audit statements. The program may
then expanded with additional audit statements.

↓ 601

Retrieve the expanded source program from the
expanded source program library into a work file.
Scan the source program for all audit statement
(Z$ statements), and summarize the audit functions
in the same display as used in the Create or
change compile and intital execution Audit options
program.

↓ 602

Display the audit functions in the expanded source program
    Allow any or all of the audit functions to be removed
    (undone) from the work file of the input expanded
    source program. Only Z$ statements may be deleted
    from the source program.

REAL-TIME PROGRAM AUDIT SOFTWARE

CROSS REFERENCE TO RELATED APPLICATIONS

This is a continuation-in-part of application Ser. No. 09/398,310 filed on Sep. 20, 1999 now abandoned, the disclosure of which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

MICROFICHE APPENDIX

Reference is made to the Microfiche Appendix which forms a part of this document and is incorporated herein by reference. The Microfiche Appendix comprises 188 frames located on 2 microfiche.

BACKGROUND OF THE INVENTION

1. Field of the Invention

The present invention relates generally to a method and system for auditing and analyzing the execution of computer programs in real-time, and particularly to a method and system for generating source program auditing statements for debugging an application program.

2. Description of the Related Art

Typically, computer source programs are written in a source programming language by computer programmers. Alternatively, source programs can be generated by a Fourth Generation Language (4GL) or a computer-aided software engineering (CASE) tool. Programs created using a Fourth Generation Language or a CASE tool are automatically translated into source statements of a conventional programming language as an intermediate step to compilation and execution. Conventional programming languages include Common Business-Oriented Language (COBOL), formula translation (FORTRAN), Pascal, and Report Program Generator (RPG), amongst others. These conventional programming languages are source programs that are compiled into executable modules or objects so that they may be executed. Alternative programming languages, such as Java or Basic, allow source programs to be directly executed by an interpreter, bypassing the compilation step.

The programmer using a conventional or alternative programming language, or the application designer using a 4GL or a CASE tool, uses available programming tools such as objects, functions, diagrams, routines, and/or operation codes to translate a perceived or defined need into a programmed solution. The output program must be tested to determine if the program works as designed. The program is executed against data to verify the efficacy and accuracy of the program as executed. Herein both the programmer and the application designer are generally referred to as the programmer.

In the art of computer programming, the quickest and easiest part of programming is writing or generating the source program, while the most difficult and time-consuming part is making the program work correctly. The computer program needs to work correctly both initially and years later. Errors in programming result from a variety of sources. Sometimes the programming specifications are not complete or correct, resulting in errors and rewrites. Also, the programmer's understanding or logic may not be correct. Frequently, the data processed by the program is not as anticipated. In addition, unanticipated error conditions increase the probability of program error or failure. Such conditions include human error resulting from operation and training inadequacies, hardware failures, and network problems resulting from the complex interaction of events at any moment of time in a company with hundreds or thousands of computer users.

When a program does not work properly or fails completely, it is essential to provide tools for quick, comprehensive analysis of the program's execution. In addition, tools that speed identification and resolution of any problems are needed. Tools that allow the source program to be quickly and easily understood and corrected are also desirable. These tools are helpful during initial testing by the programmer to increase programmer productivity, and to increase the quality and reliability of the program. These tools are crucially needed when the program fails or must be changed by a programmer who is totally unfamiliar with the source program while it is in production, often at a time of great stress, of economic loss to the company, and in a high-risk environment. The real-time program audit software of the present invention addresses these needs for virtually any source programming language, and is also applicable in 4GL and CASE programming environments.

Programs purporting to audit the execution of themselves or other programs are found in the prior art. These prior art programs lack the real-time nature of the current invention or are not as comprehensive in their auditing capabilities. The related art is represented by the following patents of interest.

U.S. Pat. No. 5,559,884, issued on Sep. 24, 1996 to Robert L. Davidson et al., discloses a method and system for generating and auditing a signature for executable modules. Davidson et al. do not suggest real-time program audit software according to the claimed invention.

U.S. Pat. No. 5,574,898, issued on Nov. 12, 1996 to David B. Leblang et al., discloses a data processing system and method which feature an object selector including an auditor for recording, as an audit record, which versions of objects are accessed by a processor during a data processing process. Each derived object is associated with an audit record. A system build process starts the auditor prior to executing commands which produce derived objects, and stops the auditor when those commands are completed. The process records any arbitrary sequence of commands. The invention of Leblang et al. is a CASE system and cannot be utilized with other programming languages or source programs, regardless of how they are generated. Also, the invention of Leblang et al. audits which version of a file is being utilized; it is a CASE version control system. The program also generates a configuration record which provides a complete record of software builds which includes a listing of all source file versions used, versions of build tools, and all build options specified. Configuration records can then be compared by showing the differences between two builds of the same program. Other commands label the builds with version labels on object versions listed in the record. The invention of Leblang et al. is designed to monitor the version of a software program, and the objects used within that software program, during the design of the program. It is a tool to be used by computer programmers who are utilizing CASE tools to write a software program and, therefore, is not as useful as the present invention in that it is limited to CASE tool program design. Also, the invention of Leblang et al. is not useful for monitoring the execution of a program in a remote time after the creation of the program. The invention of Leblang et al. is distinctly different from the present invention in that it was not designed to monitor the execution of a program utilizing any type of programming language; the current invention is designed to monitor any type of machine code as it executes. Leblang et al. do not suggest real-time program audit software according to the claimed invention.

U.S. Pat. No. 5,754,763, issued on May 19, 1998 to Thomas W. Bereiter, shows a software auditing program which is designed to monitor the number of users who simultaneously invoke one or more application programs which occur in response to system management tasks. The auditing program therein counts the number of simultaneous invocations in order to determine whether an authorized number of copies of each program within the managed region has been exceeded. The protocol requires a dedicated license server. The sole purpose of the invention of Bereiter is to use a license server to identify violations of the licenses of an organization. The program therein does not audit any other activity nor does it aid in the actual execution of a program. It does not aid in the monitoring of program errors and trouble shooting during the execution of a program or system, as does the current invention. Bereiter does not suggest real-time program audit software according to the claimed invention.

U.S. Pat. No. 5,794,252, issued on Aug. 11, 1998 to Bruce W. Bailey et al., discloses a database management system which utilizes a remote duplicate database facility to monitor changes made to a database on a local system and to maintain a copy of that database on a remote system. The invention of Bailey et al. verifies data files making sure that the data or other file, relied upon by the user, is the most up-to-date file available. The system verifies that the files are protected from interruptions, errors, or failures in the computer operations. Bailey et al. protect database files and other files from being lost by creating a remote backup of those files as they are made and stored. Bailey et al. also make a record of the backups in order to verify that the most recent files are in use and are concurrent with the backup records. The invention of Bailey et al. is distinctly different from the current invention. Bailey et al. protect or audit data files, while the current invention audits program executions. These are very distinct activities. Bailey et al. do not suggest real-time program audit software according to the claimed invention.

U.S. Pat. No. 5,813,009, issued on Sep. 22, 1998 to Johnson et al., describes a computer based records management system which filters information to assure that record data units offered to the system for storage are complete and not redundant. These record data may originate from a variety of sources, such as electronic data, data scanned from paper, data digitally formed from audio, video, or otherwise formed as digital data information media. The goal of Johnson et al. is to provide a record keeping medium which eliminates the need for paper or microform record keeping. The system therein audits itself to assure that only the most up-to-date and accurate records are maintained. Johnson et al. provide for record data unit tracking and audit trails in the event of any requirement for regulatory or legal compliance with discovery or other record unit requests. Johnson et al. also permit reconstruction of the record units of an enterprise in the event of a catastrophic event. Johnson et al. audit storage files but not program execution and is, therefore, distinctly different from the present invention. Johnson et al. do not suggest real-time program audit software according to the claimed invention.

International Patent document WO 93/01550, published on Jan. 21, 1993, discloses a method and system for recording the use of a licensed product, and for controlling its use. International '550 does not suggest real-time program audit software according to the claimed invention.

None of the above inventions and patents, taken either singularly or in combination, is seen to describe the instant invention as claimed. Thus, a real-time program audit solving the aforementioned problems is desired.

SUMMARY OF THE INVENTION

The current invention, a real-time program audit software program, is a software program, a method, and a system for generating source program audit statements which examine and verify program statements and data as the program executes. The audits generated by the real-time program audit provide real-time analysis of the execution of the program. The real-time program audit software may be used with any programming language that uses source program statements, whether the source statements are compiled into an executable object or are interpreted during program execution. Conventional source programs are selected for auditing based on an audit profile. The audit profile is customized for specific compile and initial execution options. The source program is expanded with the selected audit statements. The source program is compiled with a conventional language compiler. Program execution audits are based on the initial execution audit profile, customized execution audits, or dynamic audits specified during program execution. Program audit output is to a disk or print file, and is available for immediate online display or printing, or for expanded auditing analysis. Expanded auditing analysis provides for extensive analysis of the real-time program audit output data from all audited programs based on the desired analysis, which includes program, user, date and time ranges, audit code prefixes, audited file, field, label, and any execution audited data value.

The real-time program audit software is a new approach to auditing the execution processing of programs of virtually any source programming language. The real-time program audit is basically a pre-compiler program that is specific for the type of programming language utilized. In other words, a different version of the real-time program audit software is required for each programming language compiler or interpreter utilized.

Accordingly, it is a principal object of the invention to audit the execution of every program statement selected for auditing in real-time. The audit includes all field names used in the audited source statements and their data values at program execution. Date and time are included in the audit. Real-time online review and analysis of the auditing is an integral part of the real-time audit program software. Real-time printing of the auditing for off-line review and analysis is also provided.

It is another object of the invention to expand the input conventional source program with the audit statements, using an easily understood method of source program expansion that does not materially alter or change the processing, flow or conventional output of the program as it executes. The invention, alternatively, permits the existing conventional source program to optionally remain unchanged by creating a separate expanded source program in another library.

It is a further object of the invention to utilize the expanded source program and the audit statements as the basis for analysis of the program execution audit output. The invention provides for more rapid understanding and correction of errors, problems, or programming logic than is possible with the conventional source program. The source program is expanded with standard comprehensive program documentation. Examples of the documentation provided are file names, file keys, and call program names. This expansion results in source program's being significantly faster to write and test by the original programmer. Also, the program is much easier to read and understand by programmers unfamiliar with it, and therefore programmers can more easily modify the program.

Still another object of the invention is to provide default audit compile profiles which provide for typical auditing environments such as first program test audits, completed program test audits, pilot production audits, and production environment audits. The default audit profiles simplify the process of selecting auditing options to be included in the expanded source program. The invention allows a selected audit profile to be modified for the selected program and used when the conventional source program is expanded with audit statements.

Another object of the invention is to allow virtually any executable source program statement to be audited. The invention also allows virtually any file in the source program to be audited, together with desired file operation codes, and the data for all key fields used in the audited file operations. The invention provides ten levels of auditing which may be dynamically changed during program execution. Any executable operation code may be audited together with all fields referenced in each audited statement. Also, the invention provides standard audit operation code audit prefix codes beginning with the characters Z$, and with a suffix code unique to the operation code.

A further object of the invention is to allow virtually any field or label used in the source program to be audited when either referenced or modified, together with the data value of each audited field. Also, the invention provides select and omit functions which qualify the auditing of operation codes by field name(s).

Another object is to provide program default initial execution profiles, which are provided for typical initial execution environments, such as first program test, completed program test, pilot production, and production environment. The default initial execution profiles simplify the process of auditing the execution of programs by providing frequently selected audit execution options. The invention allows a selected execution profile to be modified for the selected program and used during the execution of the program.

It is a further object of the invention to provide for dynamic modification of program auditing during program execution by changing execution auditing options, or turning auditing on or off completely. Audits must have been previously selected for potential audit and included in the expanded source program.

An additional object is to optionally output audit data to a disk, and to provide for the retention of the audit data for both test and production environments. The invention also provides an audit database in date and time sequences from all audited programs. This provides for analysis of audited statements across all audited programs by date and time sequence. The analysis may include program, user, date and time range, audit code prefix, file, field, label, and/or any execution audited data value. The invention provides formatted audit reporting of historical audit information for use by internal and external auditors at a level of detail and auditability not possible previously.

Another object of this invention is to reduce the cost of developing and maintaining source programs by significantly reducing the skills and training needed by programmers, and to reduce much of the risk involved in implementing and maintaining programs. The invention also reduces the number of programmers required to develop and maintain programs.

Additionally, it is an object of the invention to provide the real-time detailed audit information needed for advanced event detection and event action software functions. This object may be advantageous in a large variety of computer operation settings and is particularly useful with multiple programmers and users that are utilizing the same programming language on the same compiler on a remote computer.

It is an object of the invention to provide improved elements and arrangements thereof in real-time program audit software for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 9A is a portion of the flowchart of the pseudo-code for the expand source program with audit statements program (Z$PGM02).

FIG. 9B is a portion of the flowchart of the pseudo-code for the expand source program with audit statements program (Z$PGM02).

FIG. 10A is a portion of the flowchart of the pseudo-code for the expand source program with audit statements program (Z$PGM02).

FIG. 15A is a portion of the flowchart of the pseudo-code for the modify source program compile and initial execution audit options program (Z$PGM06).

Similar reference characters denote corresponding features consistently throughout the attached drawings.

DETAILED DESCRIPTION OF THE PREFERRED EMBODIMENTS

Figure 1A:
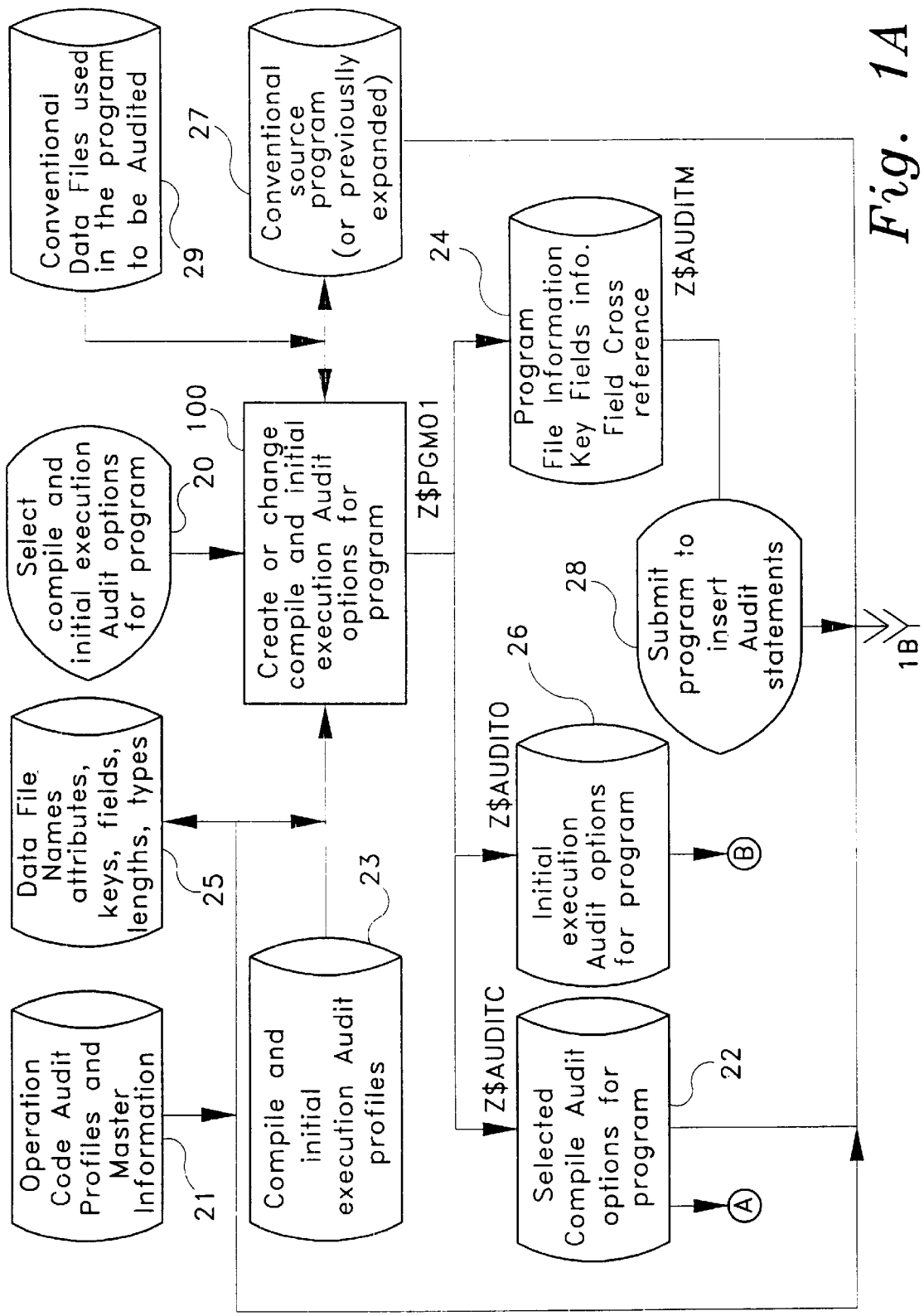
FIG. 1A is a block diagram of the source program compile and initial execution audit functions (program Z$PGM01).

The present invention is a real-time program audit software that is a method and system for generating source program audit statements which provide analyses of program statements and data as the source program executes. These audit statements provide for real-time analysis of the execution of the program. The real-time program audit software is applicable to virtually any programming language that uses source program statements, whether the source statements are compiled into an executable object or are interpreted during program execution. Conventional source programs are selected for auditing based on an audit profile; the audit profile is customized for specific compile and initial execution options; the source program is expanded with the selected audit statements; and the source program is compiled with a conventional language compiler. Program execution audits are based on the initial execution audit profile, customized execution audits, or dynamic audits specified during program execution. Program audit output is to a disk or print file, and is available for immediate online display or printing, or for expanded auditing analysis. Expanded auditing analysis provides for extensive analysis of the real-time program audit output data from all audited programs based on the desired analysis, which includes: program, user, date and time ranges, audit code prefix, audited file, field, label, and any execution audited data value.

For purposes of the present application, it will be understood that the following definitions apply.

"Conventional programming language" is defined to be any artificial language that can be used to define a sequence of instructions that can ultimately be processed and executed by a computer; a translation process, from the source code expressed using the programming language to the machine code that the computer needs to work with, must be automated by means of a compiler. As used herein, the term "programming language" refers to any series of source codes regardless of whether the program statements are compiled or interpreted.

"Source code" is human-readable program statements written in a high-level or assembly language that are not directly readable by a computer.

A "source program" is the source code version of a program.

"Object code" is the code, generated by a compiler or an assembler, that was translated from the source code of a program. Object code generally refers to machine code that can be directly executed by the system's central processing unit (CPU), but it can also refer to assembly language source code or a variation of machine code.

An "interpreter" is a program that translates and then executes each statement in a program written in an interpreted language.

A "compiler" is any program that transforms one set of symbols into another by following a set of syntactic and semantic rules. Also, a compiler is a program that translates all the source code of a program written in a high-level language into object code prior to execution of the program. As used herein, "compiler" refers to both interpreter and compiler.

"Real-time" refers to a time frame wherein the computer responds to situations as they occur. The analyses which occur in the present invention occur at the rate at which the audited program is executed. Real-time operations are those in which the machine's activities match the human perception of time or those in which computer operations proceed at the same rate as a physical or external process.

"Operation (OP) code" is the portion of a machine language or assembly language instruction that specifies the type of instruction and the structure of the data on which it operates.

The term "validating" refers to accepting a pre-chosen variable or changing that variable to a preferred variable. Variables include program language, conventional source program, and audit profile.

In a preferred embodiment, the present invention provides a method and system for generating computer source code audit statements from input source programs of virtually any commercial programming language. The generated audit source statements are inserted into a copy of the input source program (the conventional source program), become an integral part of the copied source program (the expanded source program), and are available for optional auditing at any time during program development, program testing, implementation, or in a production environment, without intervention by the programmer, or anyone else. The generated source code audit statements then may be utilized during the execution of the compiled program object, or execution of an interpreted source program, to provide a real-time audit of the detailed processing of the program against the data processed by the program. The resulting real-time audit output may be viewed online as the program execution takes place, or may be viewed later both online or in printed audit analysis reports. Audits may be specified at up to ten levels, providing for no auditing, auditing of only key program functions, to very comprehensive auditing of virtually every executable instruction as it is executed, with all the data processed by the instruction. The level of auditing may be changed dynamically as the program is executing by using dynamic audits.

In addition, this invention provides for the insertion of source program documentation statements into the input conventional source program. This provides comprehensive and useful program documentation not normally found in conventional source programs written by most commercial programmers, and not available in most commercial software products. The resulting expanded source program becomes much easier to read and comprehend, particularly for programmers unfamiliar with the program, and the resulting source program logic is much easier to understand by viewing the audit output of the actual processing being performed against the data being processed. The real-time program audit software provides a separate licensed implementation for each source programming language implementation supported. Thus, each programming language vendor compiler that supports specific language functions and operation codes (OP codes) could have a licensed implementation of the real-time program audit software which would support that specific language implementation. Each programming language requires a separate version of the real-time program audit software.

Figure 1B:
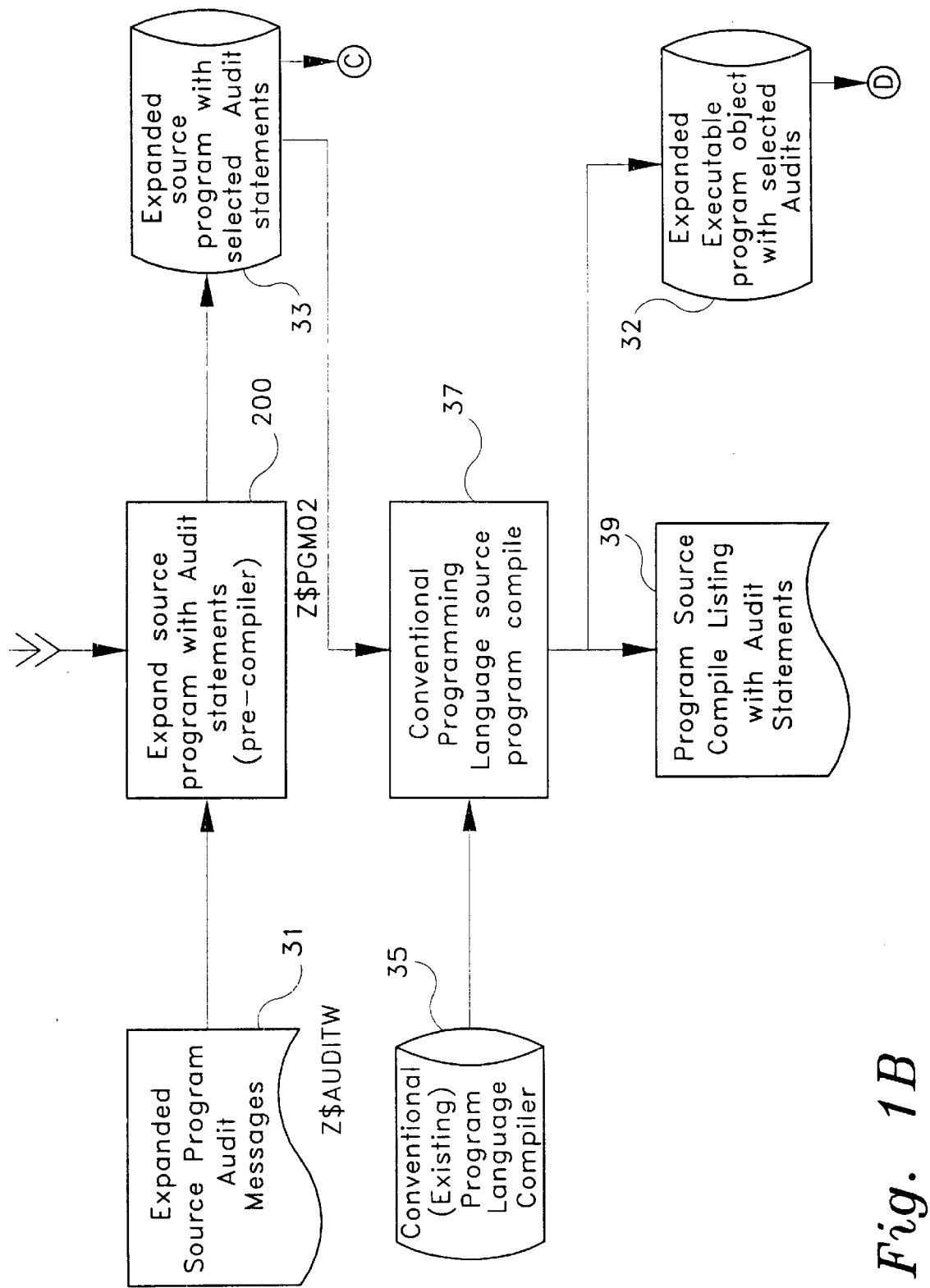
FIG. 1B is a block diagram of the expansion of the conventional source program with audit statements (program Z$PGM02), and the conventional programming language compile of the expanded source program.

FIG. 1A shows a block diagram of the initial input and output files needed for the real-time program audit software. FIG. 1A shows the source program compile and initial execution audit functions used. The program module create or change compile and initial execution audit options for program 100 handles the initial input/output files for the real-time program audit software. The create or change compile and initial execution audit options program 100 (Z$PGM01) allows the programmer to quickly and easily audit and document the conventional source program 27 or select additional audits for a previously expanded source program. This program is a setup program for the expand input with audits program, the pre-compiler 200 (Z$PGM02) (FIG. 1B), and provides all the information and options needed to expand the source program with audit statements.

The select compile and initial execution audit options 20 for program 100 represents the screen input. Here the programmer decides which files and additional information is to be audited by the real-time program audit software.

The operation code audit profile and master information file 21 contains an audit profile of virtually every operation code and file description format used by programmers in writing source programs in the vendor programming language implementation. The operation code audit profile and master information file 21 determines exactly how the operation code is to be audited, if selected for auditing, including all variable names and status codes used in the instruction. The profile also determines whether the audit is to be inserted before the source statement (as in branches), or after the source statement (as in file I/O). The operation code audit profile and master information file 21 contains the standard audit prefix code for the operation code, such as Z$R for READ and Z$W for WRITE.

The compile and initial execution audit profiles 23 master file contains a default compile audit profile, and a default initial execution audit profile for typical programming environments such as: initial compile, where comprehensive documentation would be appropriate; initial test, where audits of all file input and output would be appropriate; pilot implementation, where comprehensive auditing would be appropriate; and for production implementation, where selected auditing such as key event auditing may be appropriate. Production implementation auditing is critical for enhanced error correction and for auditing by internal and external auditors.

The data file names, attributes, keys, fields length, and types 25 master file contains all the necessary information about each file used in the source program to insert the audit and documentation statements into the expanded source program. This information is automatically generated by analyzing the compile listing output of the conventional input source program.

The conventional source program library 27 is the existing source program library in the programming language at the licensed customer site. Previously expanded conventional source program library files are included as a conventional source program library 27 because they are handled in the same manner as if unexpanded. Programs to be expanded with audit and documentation statements should compile successfully before program expansion, including already expanded conventional programs. Conventional data files 29 are the existing data files used in the conventional source programs at the licensed customer site.

Figure 2:
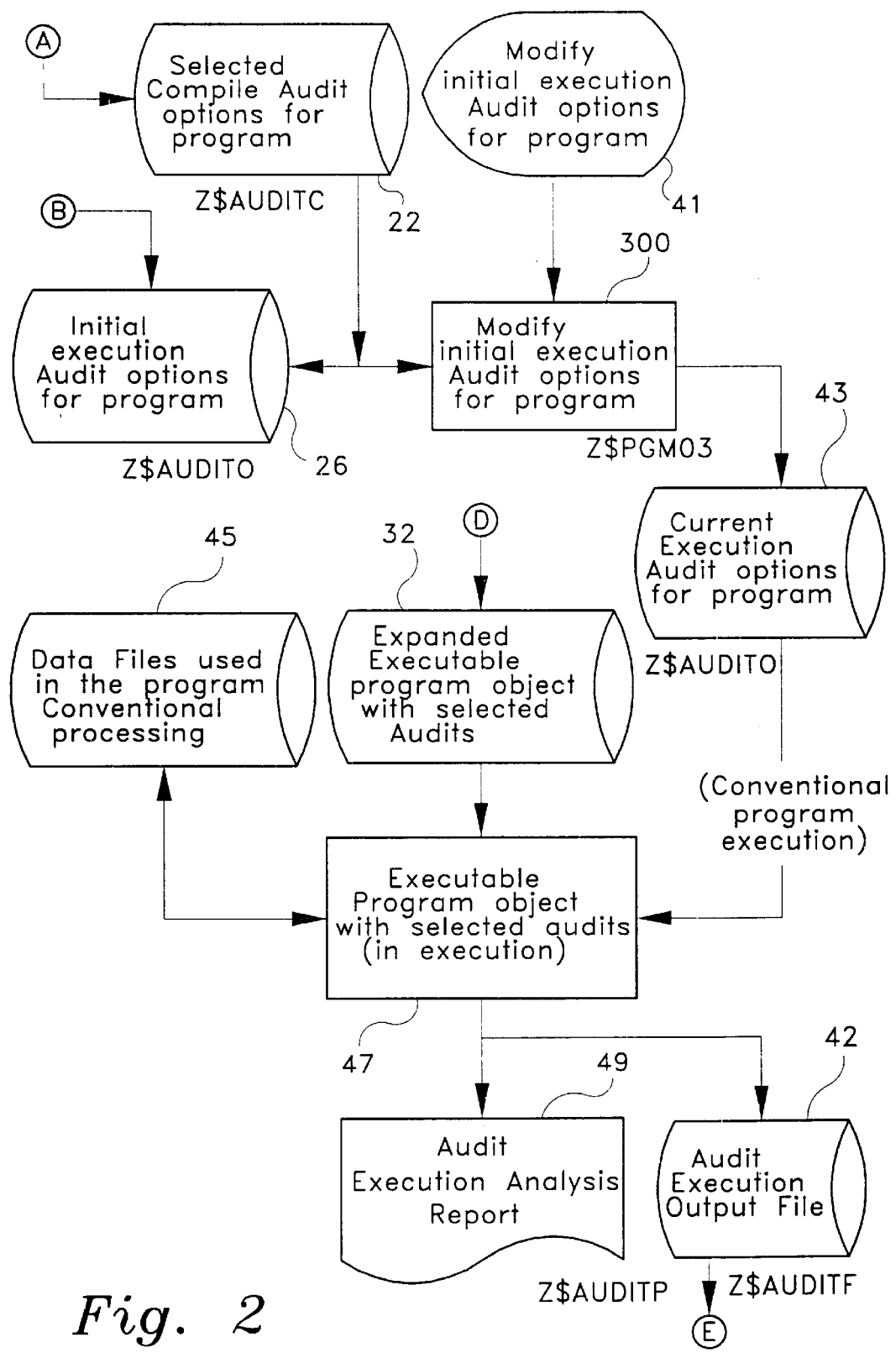
FIG. 2 is a block diagram of the program execution audit options (program Z$PGM03), including the modification of the initial execution audit options, and the conventional execution of the compiled program object with audit outputs.

An appropriate audit profile is selected for the selected program name, together with an initial execution profile. The default audit profile, documentation options, and initial execution options may be utilized, or the profile options may be extensively modified for each program file, operation code, field and label used in the conventional source program. In addition, the ability to bypass auditing of labeled subroutines or procedures that are specified by the programmer or for the entire installation is provided. This provides the ability to bypass the auditing for very repetitive routines such as date validation and field names defined as constants, which can greatly reduce the amount of audit output, allowing focus on key program processing routines. The selected compile audit options file 22 (Z$AUDITC), and the program file and field information file 24 (Z$AUDITM) are output, and used in the next program, the expand input with audits program, the pre-compiler 200, to expand the source program with audit statements. The initial execution audit options file 26 (Z$AUDITO) is also output, and is used during program execution to create audit output. The selected compile audit options file 22 provides output which can also be used as shown in FIG. 2. This is denoted by the circled capital A. The initial execution audit options file 26 also provides output which can be used, as denoted by the circled capital B. Advanced and online review of output audits is also provided, by optionally displaying the source program variable names on a line above the actual audit data being executed. This optional review is available only if the expanded source program is online during review of the audit output file, which is normally the case. The ability to select and sequence virtually any file record (data) field when auditing file record processing is provided, as well as the ability to select and sequence virtually any (data) field when auditing any label in the program. The ability to audit any changed (data) field in a specified labeled subroutine or procedure is provided, in addition to the ability to audit any specified (data) field, including auditing only when the field is changed.

The submit program to insert audit statements 28 (FIG. 1B) represents screen input. Here the programmer decides whether to submit the conventional program to the expanded with audit statements by real-time program audit software. The block diagram shown on FIG. 1A continues to FIG. 1B, as shown.

The expand input with audits program, the pre-compiler 200 (Z$PGM02), provides a one-pass expansion of the input conventional source program 27, utilizing the selected compile audit options file 22, and program file and field information file 24 from the previous program. This expand input with audits program 200 is the major module in this invention, and it may be considered to be a pre-compiler to the conventional programming language compiler 37. The expanded source program audit messages 31 are read into the pre-compiler 200. Each conventional source statement read is examined for insertion of audit and/or documentation statements, using the selected options. Every data field for audited statements is audited, and a unique audit code is assigned to each audited statement, by suffixing the standard assigned audit prefix code with a sequential number starting with 001. Therefore, the first audited READ statement would have an audit code of Z$R001. The pre-compiler 200 is output to a separate expanded source program with selected audit statements library 33, leaving the input conventional source program unchanged. Each of the audit statements are assigned a unique fifteen digit number to provide for a second level file of very detailed audit information for every audited source statement executed. This optional detailed auditing provides for auditing all of the one hundred RPG indicators, and the command keys, and other key information at every audited statement executed in the expanded source program for RPG language implementations. Standard audit printer and disk file definitions are copied into the program, together with routines to initiate and change auditing during program execution. The pre-compiler 200 also includes an express expand source option which utilizes default audit options normally utilized by the programmer. This express expand option allows a programmer to key only the program name and then to press a command key to expand the input source program with real-time program audits. This express option is in addition to the option to fully customize the audits by file, record format, operation code, field, and program label.

Figure 5:
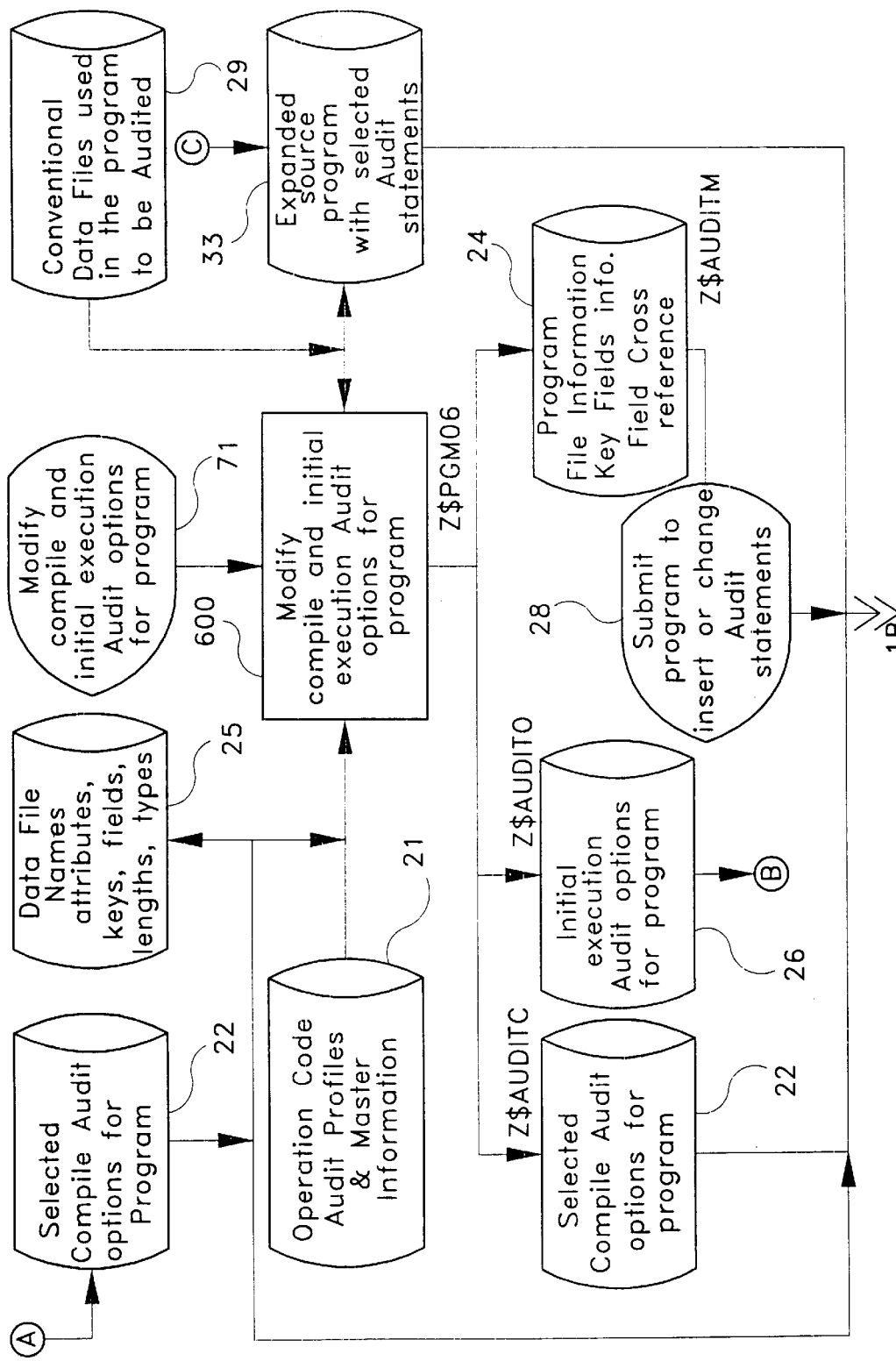
FIG. 5 is a block diagram of the modify source program compile and initial execution audit options (program Z$PGM06), including the capability to undo all or selected audit source statements.

The expanded source program with selected audit statements library 33 and the conventional (existing) program language compiler files 35 are read into the conventional programming language source program compiler 37. The conventional programming language source program compiler 37 compiles the expanded source program, producing an expanded executable program object with selected audits 32 having the compiled audit statements. The conventional programming language source program compiler 37 also produces a program source compile listing with audit statements document 39. The source program compile listing may be utilized as the basis for creating real-time programming audit work files. The compile listing completely defines the program files, fields, labels, and operation codes including copybooks utilized in the source program. The expanded source program with selected audit statements library 33 and the expanded executable program object with selected audits 32 are also referred to in other block diagrams denoted by the circled capital letters. The expanded source program with selected audit statements library 33 is utilized in FIG. 5 as denoted by the circled capital C, and the expanded executable program object with selected audits 32 is utilized in FIG. 2 as denoted by the circled capital D. It is possible to include several commonly utilized levels of compilers in the same language implementation. For example, for IBM AS/400 RPG, both the RPGIII (RPG/400) and RPGIV (ILE RPG) can be provided in the same implementation. For IBM AS/400 COBOL, both COBOL/400 and COBOL ILE can be provided in the same implementation.

FIG. 2 shows a block diagram of the program which is responsible for the execution of audit options. The modify initial execution audit options program 300 (Z$PGM03) allows the programmer to quickly and easily modify the selected initial execution options for compiled audit statements, even during program execution. The selected compile audit options file 22 is utilized by the modify initial execution audit options program 300. The modify initial execution audit options for program 41 represents screen input. Here the programmer decides whether to change the selections previously made pertaining to audit options for the program and to write these selections to the modify initial execution audit options program 300. The modify initial execution audit options program 300 is the program that allows the dynamic modification of the auditing options and audit output as the program is in program execution, by modifying the initial execution audit options for program file 26 into the current execution audit options file 43. The initial/current execution audit options program is (Z$AUDITO) utilized to create the initial execution audit options for program file 26 and the current execution audit options file 43.

The current execution audit options file 43 and the expanded executable program object with selected audits file 32 are used in conventional program execution by the executable program object with selected audits 47. Data files used in the program conventional processing 45 are also write to, and are written to, by the executable program object with selected audits 47. The output from the executable program object with selected audits 47 includes an audit execution analysis report 49 and an audit execution output file 42. The audit execution output file 42 is also used in FIG. 3 as denoted by the circled E.

Figure 3:
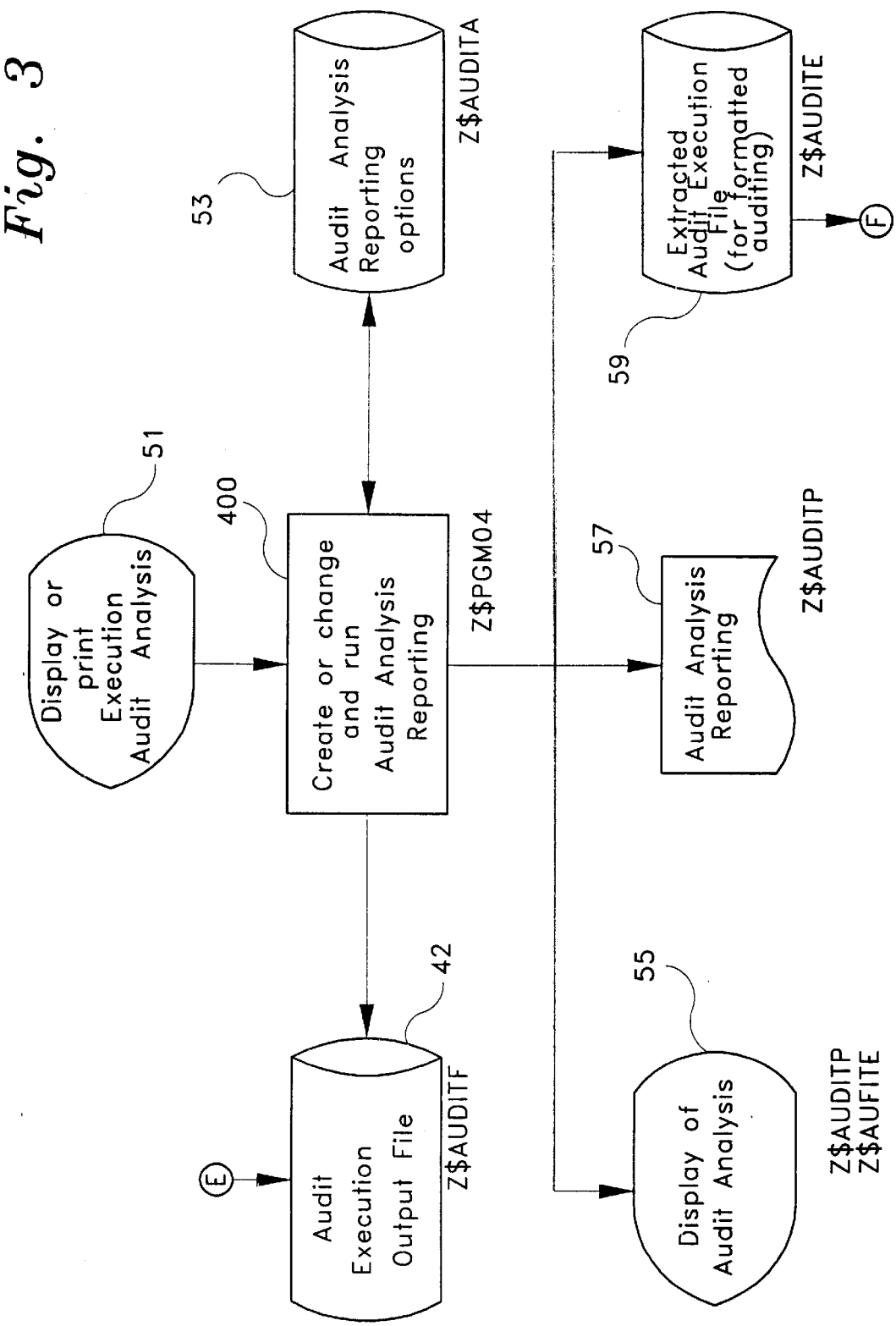
FIG. 3 is a block diagram of the create or change options and run audit analysis options (program Z$PGM04), including the creation or change of audit analysis reporting options, and the processing of the audit analysis report.

FIG. 3 is a block diagram depicting the create or change options and run audit analysis reporting program 400, and includes the creation, change and processing of audit analysis reporting options. The create or change options and run audit analysis reporting program 400 (Z$PGM04) allows the programmer or any authorized user to analyze the audit execution output file 42 (Z$AUDITF) information, if this file was output during program execution. The display or print execution audit analysis 51 screen display allows the user to decide which menus to choose. The requester may select from a menu of audit analysis functions and create printed or displayed audit output or create formatted disk audit output 59 (Z$AUDITE) for further analysis. The create or change options and run audit analysis reporting program 400 (Z$PGM04) also produces an audit analysis reporting document 57 (Z$AUDITP). Alternatively, a display of audit analysis 55 may be produced. An audit analysis reporting options file 53 (Z$AUDITA) provides the ability to save and retrieve reporting options by a name assigned to the audit analysis request. Typical audit output would be for a specific job execution of the program, or by user, terminal, date, or time range. The printed and disk audit outputs may be viewed and scanned using standard system utility programs and available utility programs in real-time as the program executes, or later for error resolution or analysis.

Figure 4:
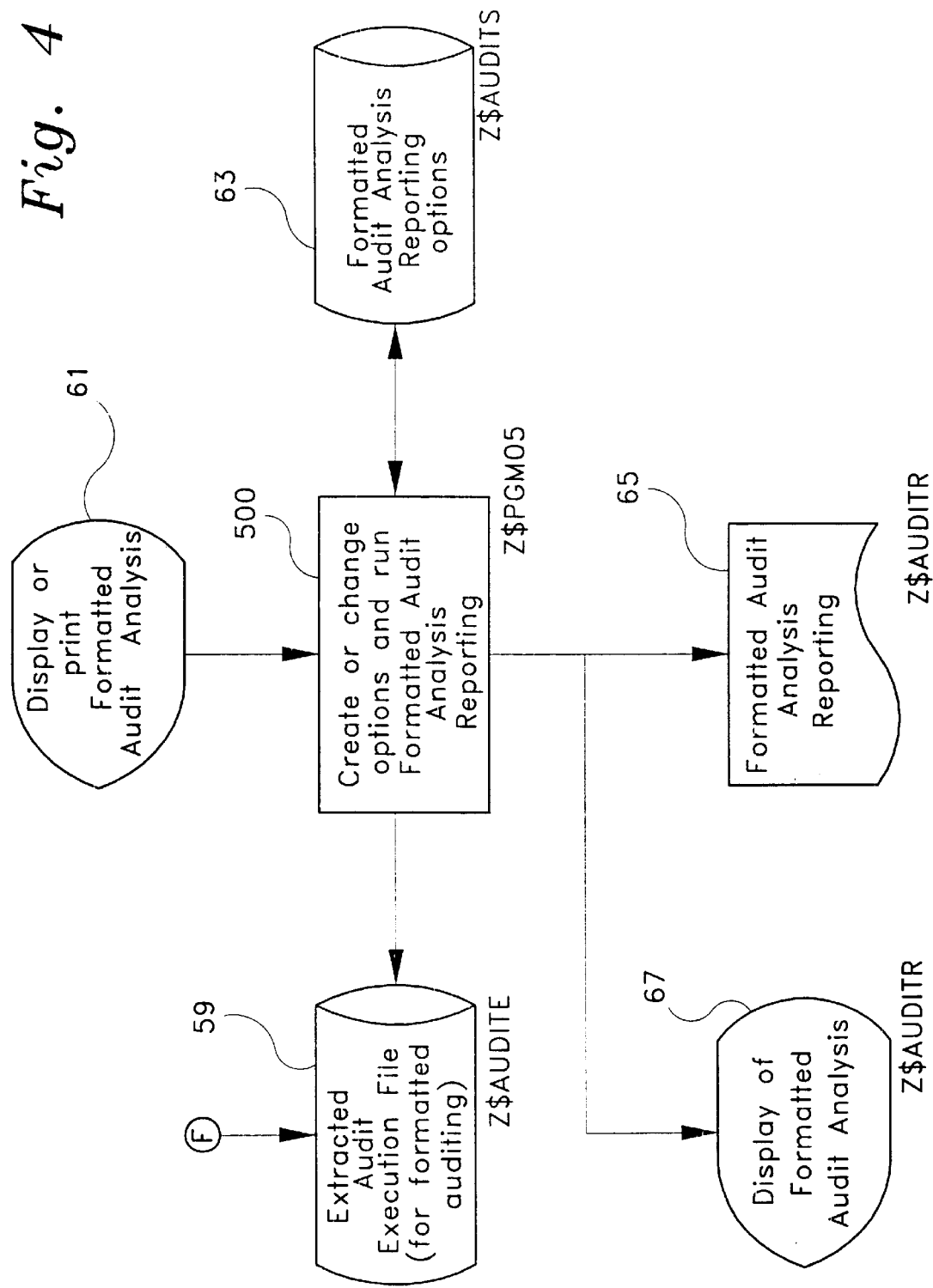
FIG. 4 is a block diagram of the create or change options and run formatted audit analysis reporting options (program Z$PGM05), and the processing of the formatted audit analysis report.

FIG. 4 shows a block diagram of the create or change options and run formatted audit analysis reporting program 500 and the processing of the formatted audit analysis report 65. The display or print formatted audit analysis 61 screen display permits the user to select options for the create or change options and run formatted audit analysis reporting-program 500 (Z$PGM05). The create or change options and run formatted audit analysis reporting program 500 (Z$PGM05) allows the programmer or any authorized user to analyze the extracted audit execution file 59 (Z$AUDITE), if the extracted audit execution file 59 (Z$AUDITE) was output by the previous program. A formatted audit analysis reporting options file 63 (Z$AUDITS) provides the ability to save and retrieve formatted reporting options by a name assigned to the formatted audit analysis request. The requestor may select from a menu of formatted audit analysis functions, presented by the display of formatted audit analysis 67, and create a printed audit output. The formatted audit analysis reporting 65 allows the user to print audit analysis. Typical audit output would be for a specific application to selected transaction types over a range of dates and times. This focused audit output is most useful for internal and external auditors in verifying the detailed computations, processing, and transactions behind more summary output. These detail transactions may be transient computations that otherwise would never have been written to disk and saved without the audits, and not available on any disk journal.

The modify compile and initial execution audit options program 600 (Z$PGM06) allows the programmer to undo or partially undo the previous expansion of source programs with audit statements, and therefore remove the expanded source program with selected audit statements file 33. The input/output to the modify compile and initial execution audit options program 600 is shown in the block diagram FIG. 5. The expanded source program is read from the expanded source program library and contains the expanded source program with selected audit statements file 33. All audit and documentation statements are summarized and displayed to the programmer on screen by the modify compile and initial execution audit options for program 71 screen display. The programmer may then undo all or some of the auditing or documentation selections. The initial execution options for the program are similarly read, summarized, and displayed to allow the undoing of these selections. The source program may then be expanded with additional audit, documentation, and initial execution options with the expand input with audits program 200 using input/output that is very similar to that shown FIG. 1A, and the same files are frequently used, as shown by both FIG. 1A and FIG. 5. The block diagram shown in FIG. 5 flows to FIG. 1B in the exact same manner as does FIG. 1A. The operation code audit profile and master information file 21 is utilized several times and is the same file throughout even though its position in the block diagrams are not identical. The source program may alternatively be left as a conventional program.

Figure 6A:
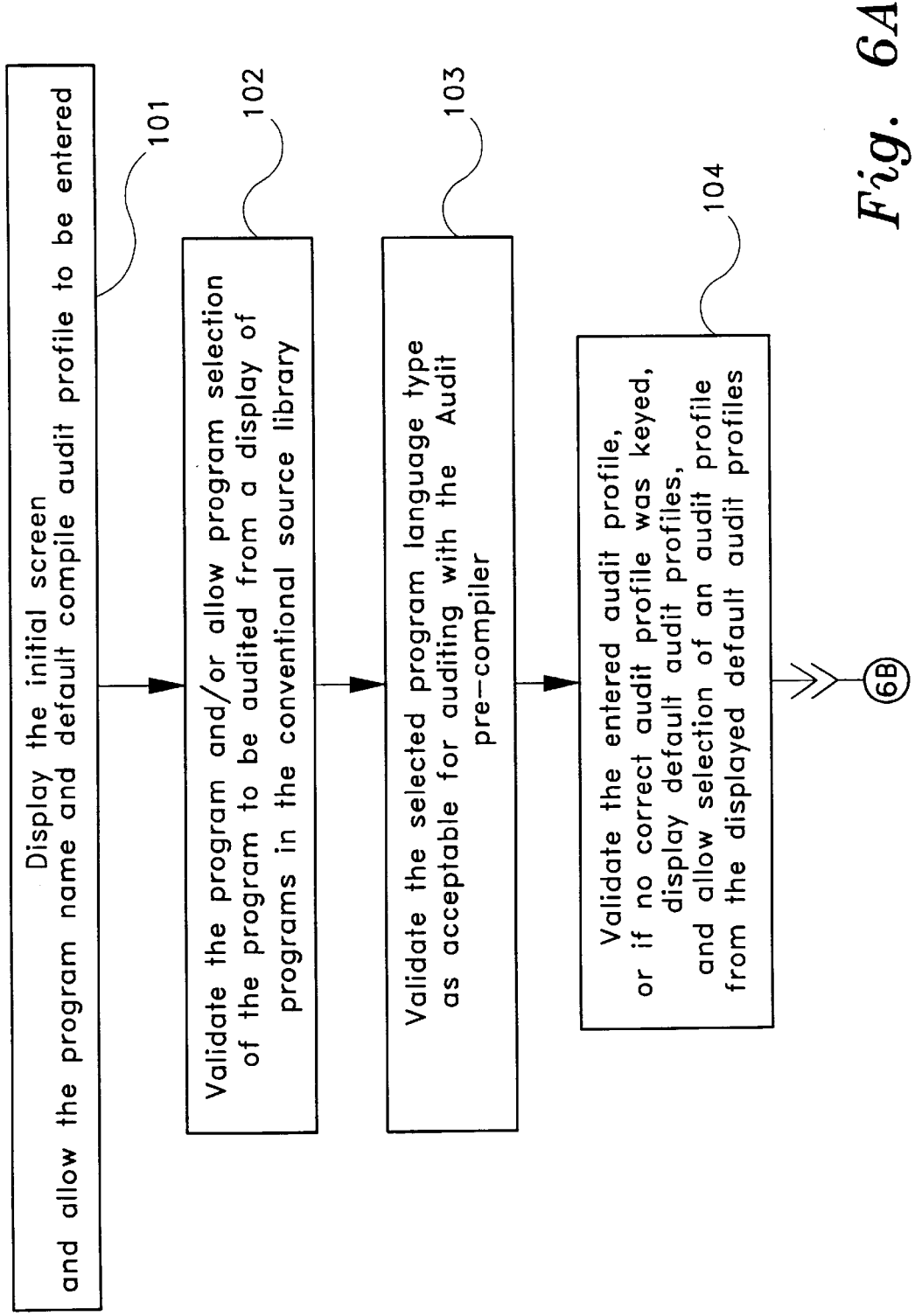
FIG. 6A is a flowchart of the pseudo-code for the create or change compile and initial execution audit options program (Z$PGM01).

The pseudo-code for the create or change compile and initial execution audit options program 100 (Z$PGM01) is shown in the flowchart depicted in FIGS. 6A, 6B, 6C, 6D, 7A, 7B, 7C, and 8. The flowchart flows linearly from figure to figure as indicated. In particular, FIG. 6A shows the initial selection on the screen display corresponding to the select compile and initial execution audit options for program 20 shown in the block diagram FIG. 1A. The initial display 101 shows the initial screen images. The initial display 101 prompts the user to enter the name of the conventional source program 27 and select the default compile audit profile from the compile and initial execution audit profiles 23 master file. The initial steps involve validating the selection of the program 102 to be audited from a display of conventional source programs 27 listed preferably in a library format, validating a selected program language 103 to determine that the program language is acceptable for auditing by the audit pre-compiler, and validating the entered audit profile 104 or allowing selection of the audit profile.

Figure 6B:
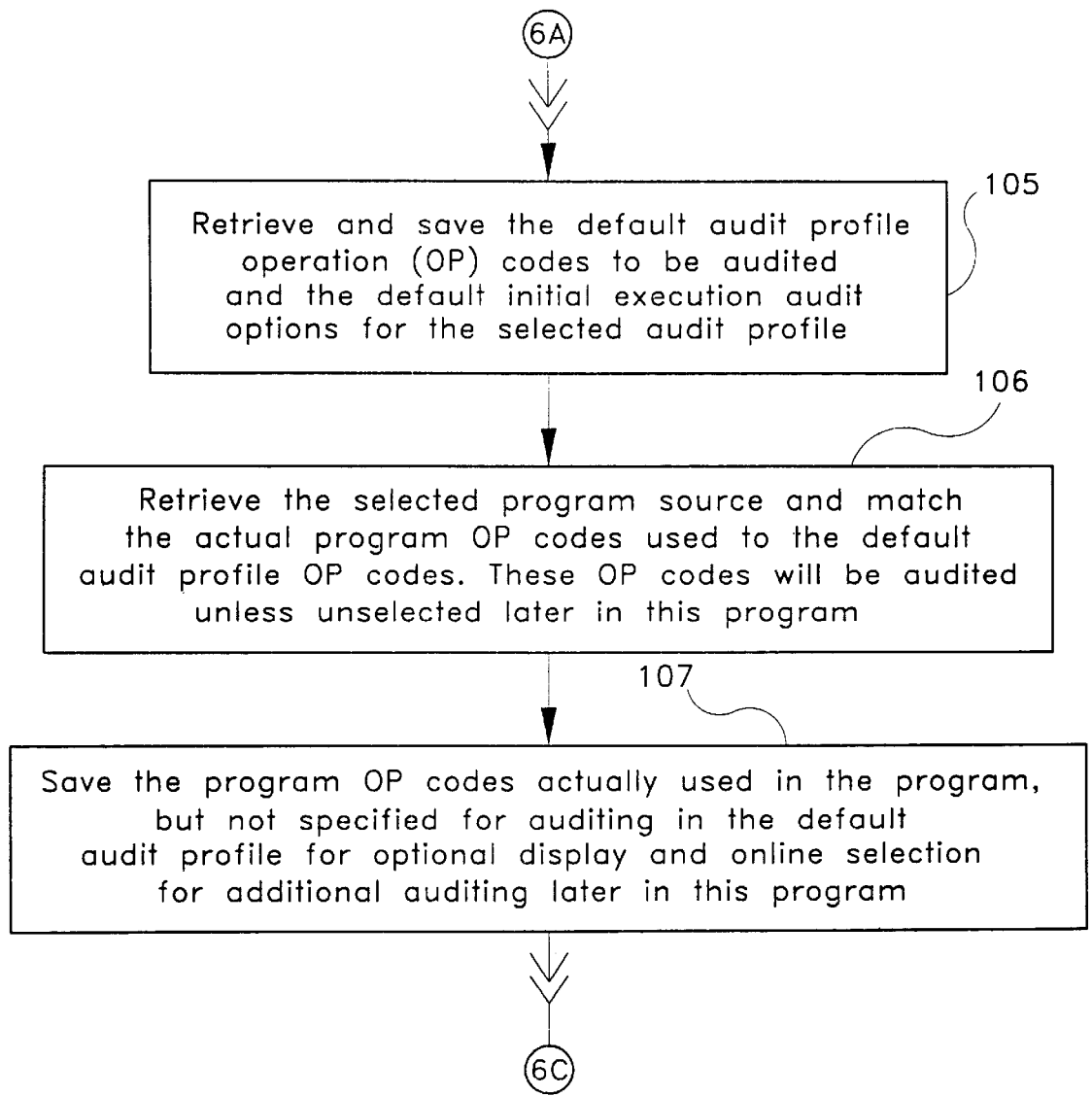
FIG. 6B is a flowchart of the pseudo-code for the create or change compile and initial execution audit options program (Z$PGM01).

FIG. 6B includes the steps of retrieving and saving operation codes 105, 106, 107. Retrieving and saving the default audit profile operation codes and the default initial execution audit options 105 are executed at this time. This step 105 includes retrieving and saving the default audit profile operation codes which are to be audited and the default initial execution audit options for the selected audit profile. The next step 106 involves retrieving and matching the operation codes to be audited. The selected program source operation code is retrieved and matched to the default audit profile operation code used. The selected operation codes are to be audited unless deselected subsequently during execution of the real-time program audit software. Next is the step 107 of saving the programs unselected operation codes. This step 107 involves saving the program operation codes which are actually used in the program but are not selected for auditing in the default audit profile. These saved program operation codes may be selected for additional auditing later during the execution of the real-time program audit software.

Figure 6C:
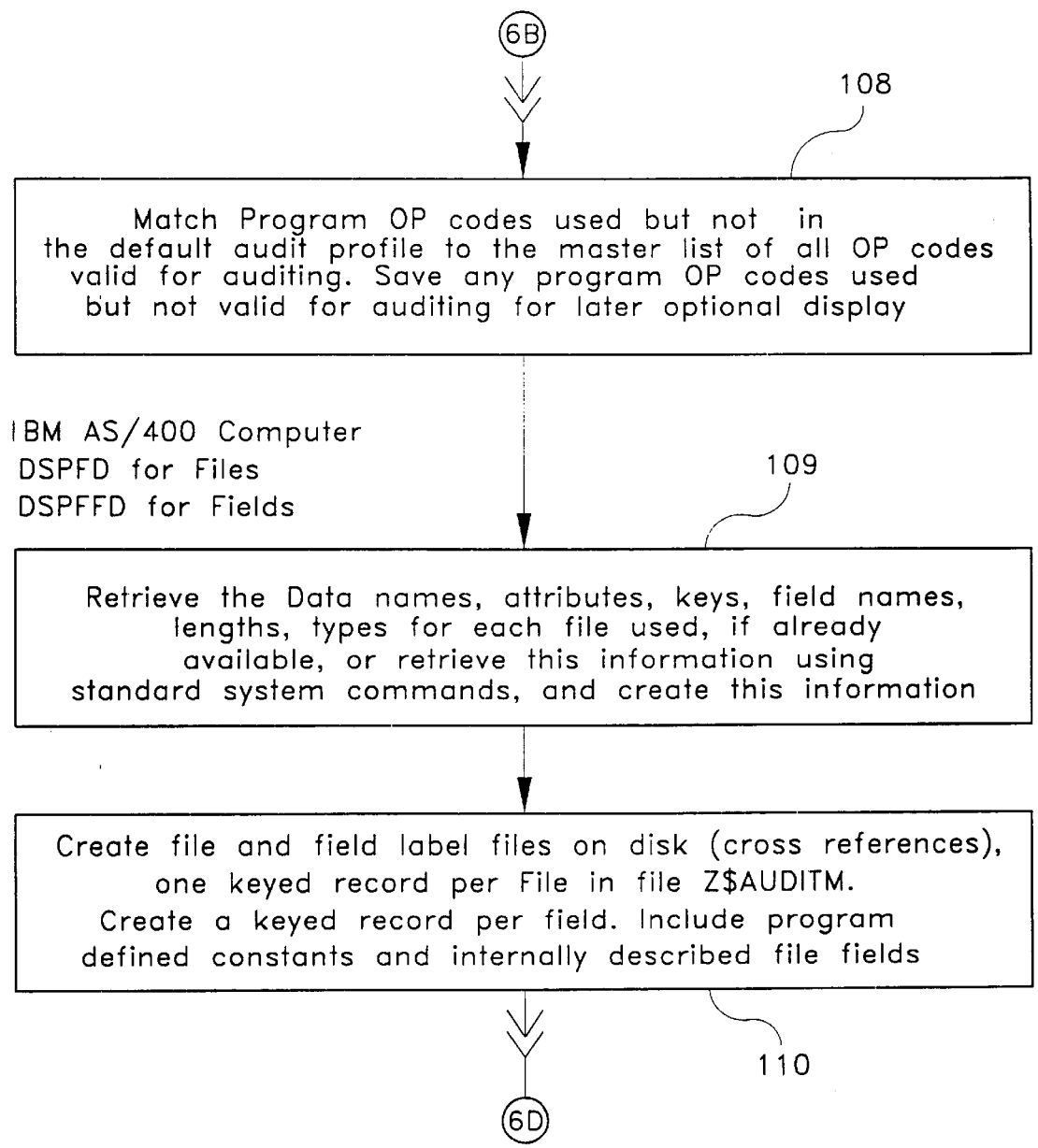
FIG. 6C is a flowchart of the pseudo-code for the create or change compile and initial execution audit options program (Z$PGM01).

As shown in FIG. 6C, these steps 108, 109, 110 involve the matching of program operation codes used by the conventional source program 27 but not in the default audit profile with the master list of all operation codes valid for auditing. Also saved are any program operation codes used by the program but that are not valid for auditing, for later optional display 108. Also shown is the step 109 of retrieving or creating the data file names, attributes, keys, fields, lengths, types 25 master file for each file used. The next step 110 creates a cross reference which involves creating a separate file and field label files on a disk with one keyed record per file. This step 110 creates the program file and field information file 24; it creates a keyed record per field including program defined constants and internally described file fields.

Figure 6D:
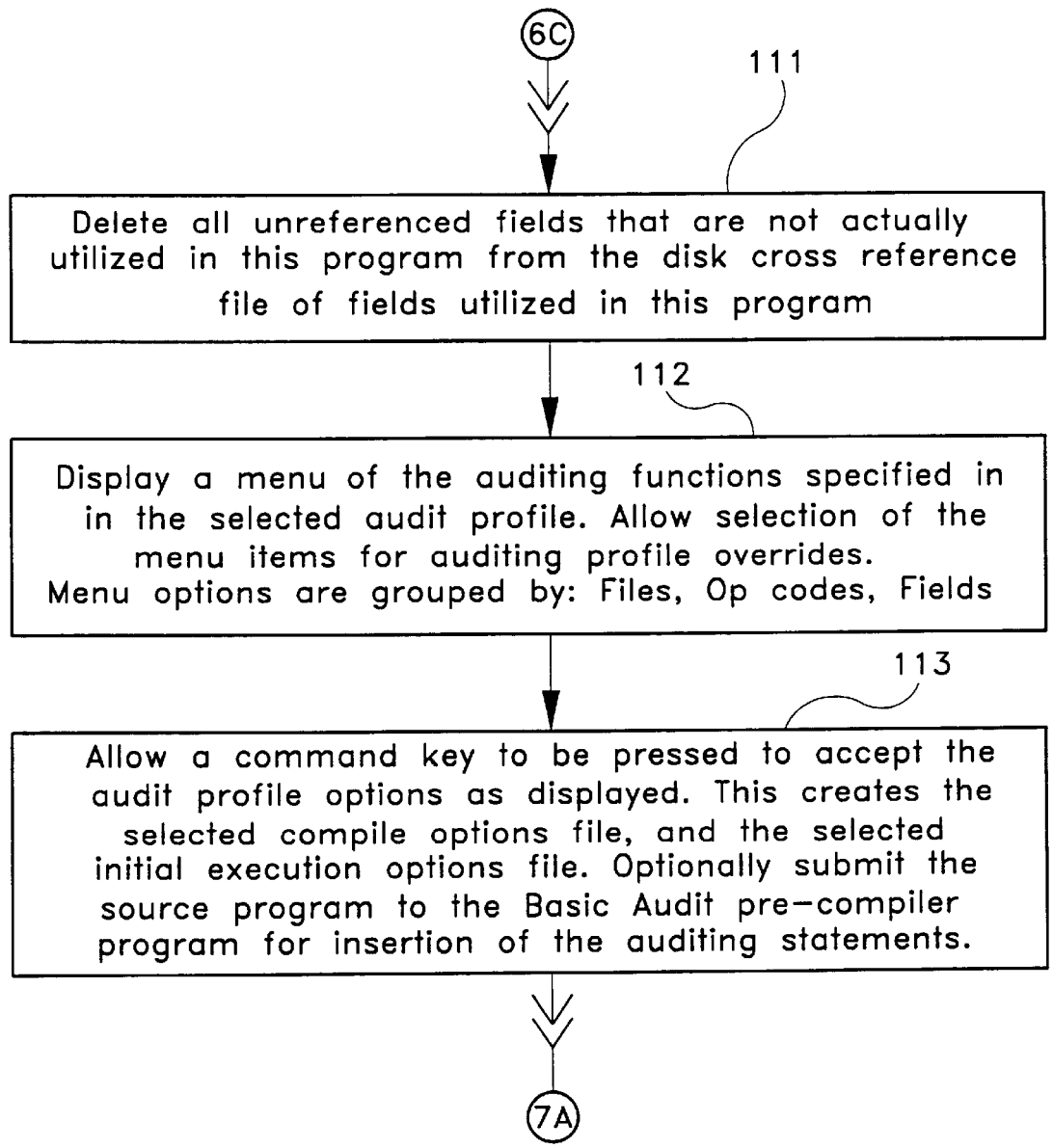
FIG. 6D is a flowchart of the pseudo-code for the create or change compile and initial execution audit options program (Z$PGM01).

As shown in FIG. 6D, the next step 111 deletes all unreferenced fields that are not actually utilized in the conventional program from the program file and field information file 24. This step 111 deletes all unreferenced fields which are not used from the disk cross reference file. The next step 112 displays a menu of the functions specified in the selected audit profile and allows the selection of the menu items for auditing profile overrides. These menu options are grouped by files, operation codes, and fields. The next step 113 allows a command key to be pressed to accept the audit profile options as displayed. This creates the selected compile audit options file 22 and the initial execution audit options file 26. An option is provided for submitting the source program directly to the basic audit pre-compiler program for insertion of the auditing statements utilizing the submit program function.

Figure 7A:
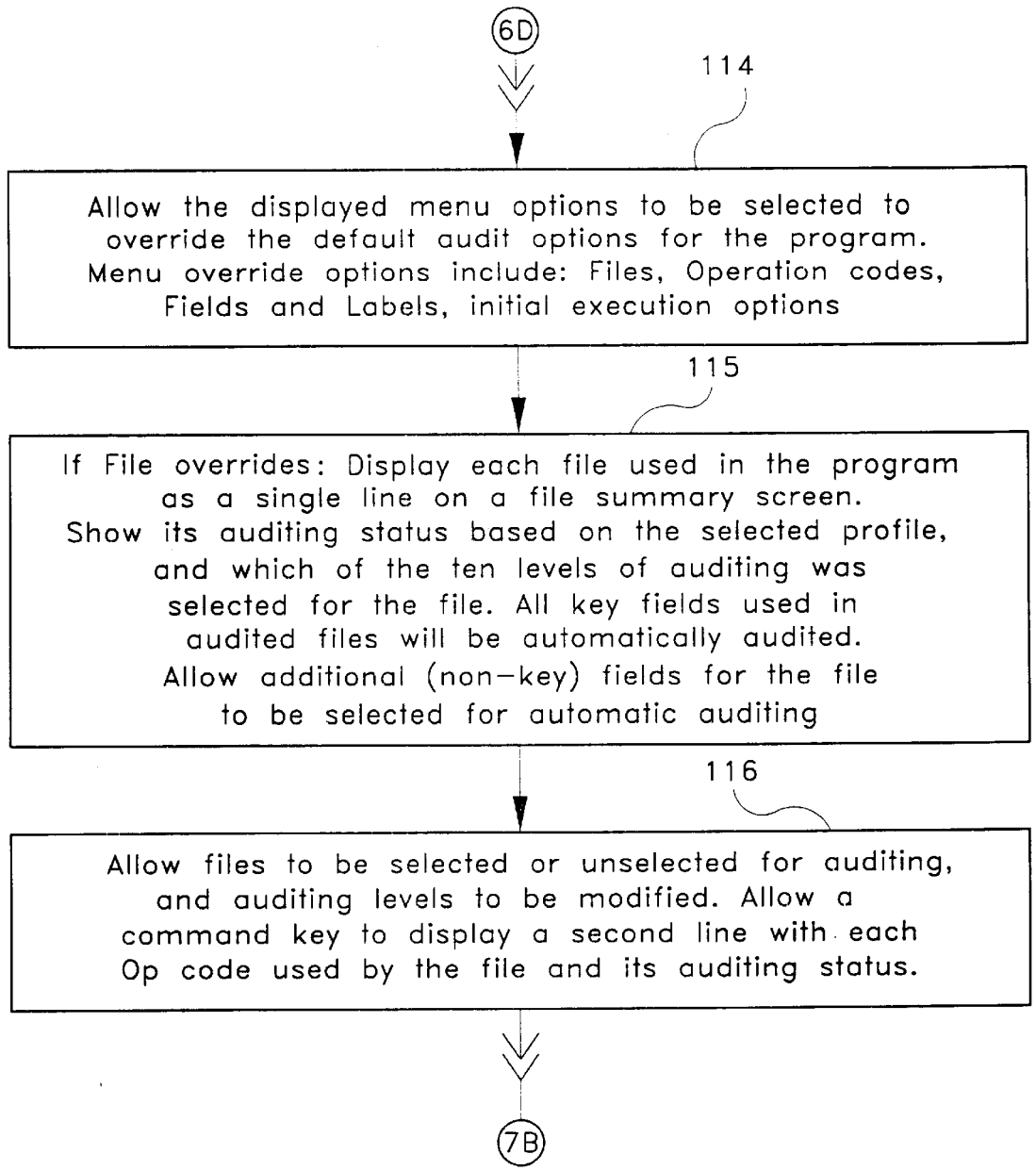
FIG. 7A is a flowchart of the pseudo-code for the create or change compile and initial execution audit options program (Z$PGM01).

As shown in FIG. 7A, alternatively to submitting the source program to the basic audit pre-compiler program, a step 114 is provided which enables the user to display the menu options in order to override the default audit options for the program. The menu override options include: Files, Operation codes, Fields and Labels, and initial execution options. If the override option File is chosen 115, the display will show a summary of the file and audit status utilized. Step 116 enables a user to select or deselect files for auditing, to modify auditing levels, and to permit a command key to display a second line with each operation code used by the file and its auditing status.

Figure 7B:
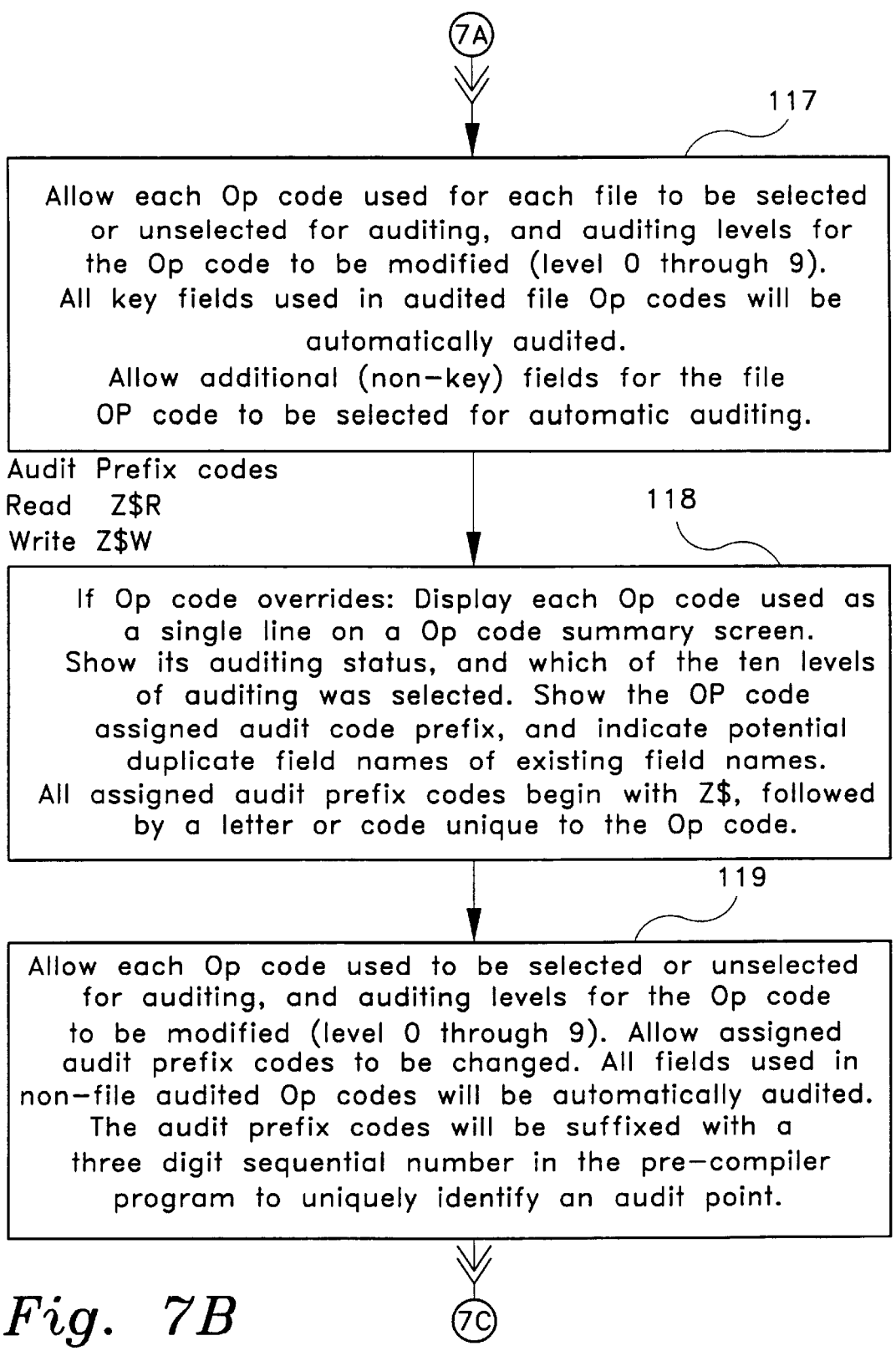
FIG. 7B is a flowchart of the pseudo-code for the create or change compile and initial execution audit options program (Z$PGM01).

FIG. 7B shows selections 117,118,119 pertaining to auditing the operation codes. Step 117 enables the programmer to select (or unselect) to audit each operation code used in each file, and to determine the auditing level. It is important to emphasize that all key fields used in the audited file's operation codes will be audited automatically. The programmer may also select additional non-key fields for automatic auditing. If the programmer chooses to use operation code overrides, step 118 displays each operation code. The display will include the auditing status of the operation code and the level of auditing selected. It will show the assigned audit code prefix and apparent duplicate field names. Step 119 enables the programmer to select (or unselect) each operation code used for auditing, the auditing level, and to change previously assigned audit prefix codes. Fields used in non-file audited operation codes will be audited automatically. Audit prefix codes will be suffixed in the pre-compiler 200 program to uniquely identify an audit point.

Figure 7C:
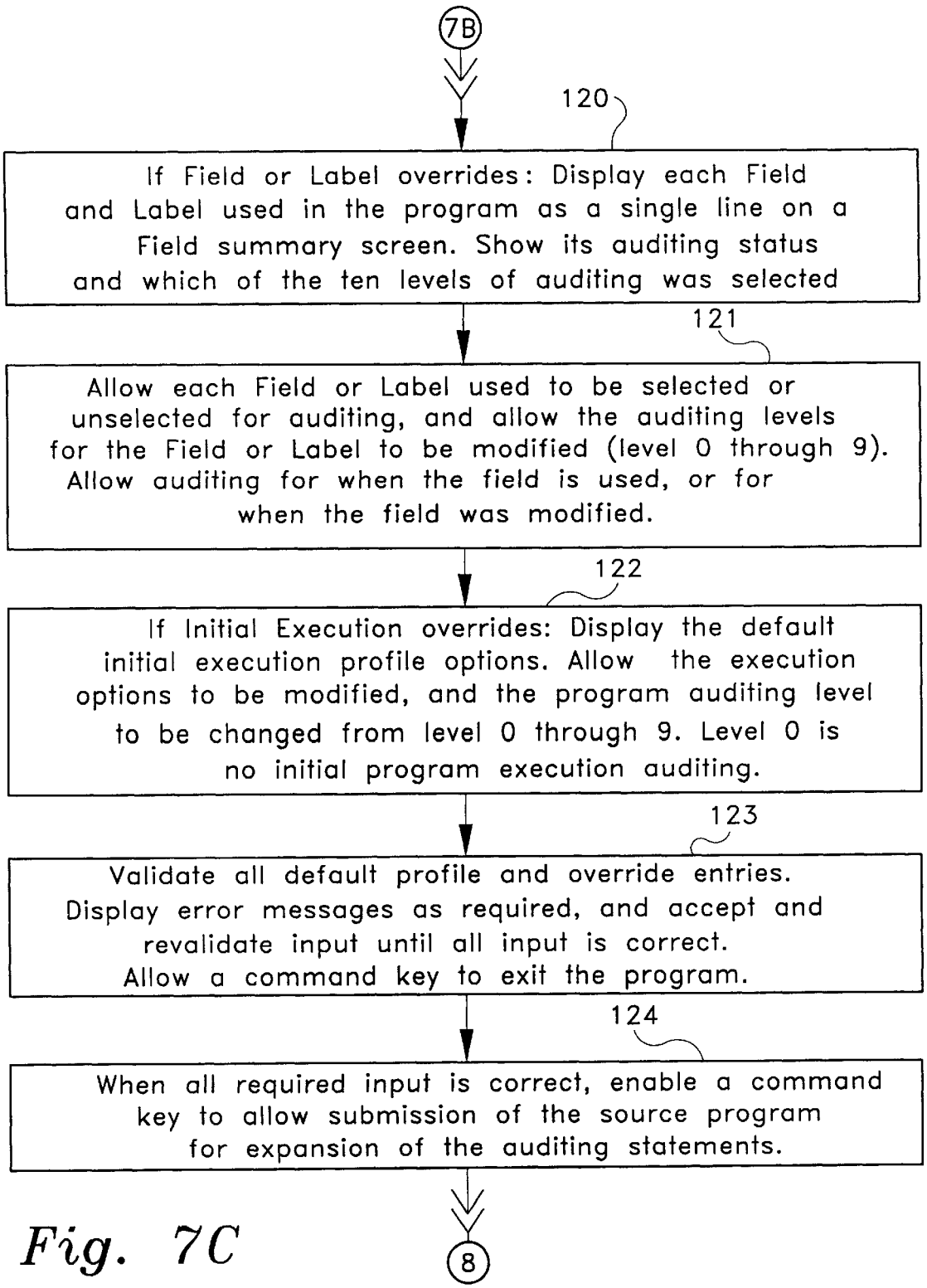
FIG. 7C is a flowchart of the pseudo-code for the create or change compile and initial execution audit options program (Z$PGM01).

FIG. 7C shows additional audit options 120,121,122,123, 124. When utilizing the Field or Label overrides, as shown in step 120, a display of each Field and Label used in the program is shown as a single line on a Field summary screen, and a display of the auditing status and which of the ten levels of auditing of each Field and Label used in the program is also shown. Step 121 enables the programmer to select (or unselect) each Field or Label used for auditing, to modify the audit levels, and to allow auditing when a field is used or is modified. When the programmer chooses to select the Initial Execution overrides, step 122 displays the default initial execution profile options. The execution options may be modified and the auditing level may be changed from level 0 to level 9. Note that level 0 has no initial program execution auditing. Step 123 requires the programmer to validate all default profile and override entries. Error messages are displayed as required, wherein the programmer accepts and revalidates input until all input is correct. Step 124 provides a command key which may be utilized to exit the program and to submit the source program for expansion of the auditing statements.

Figure 8:
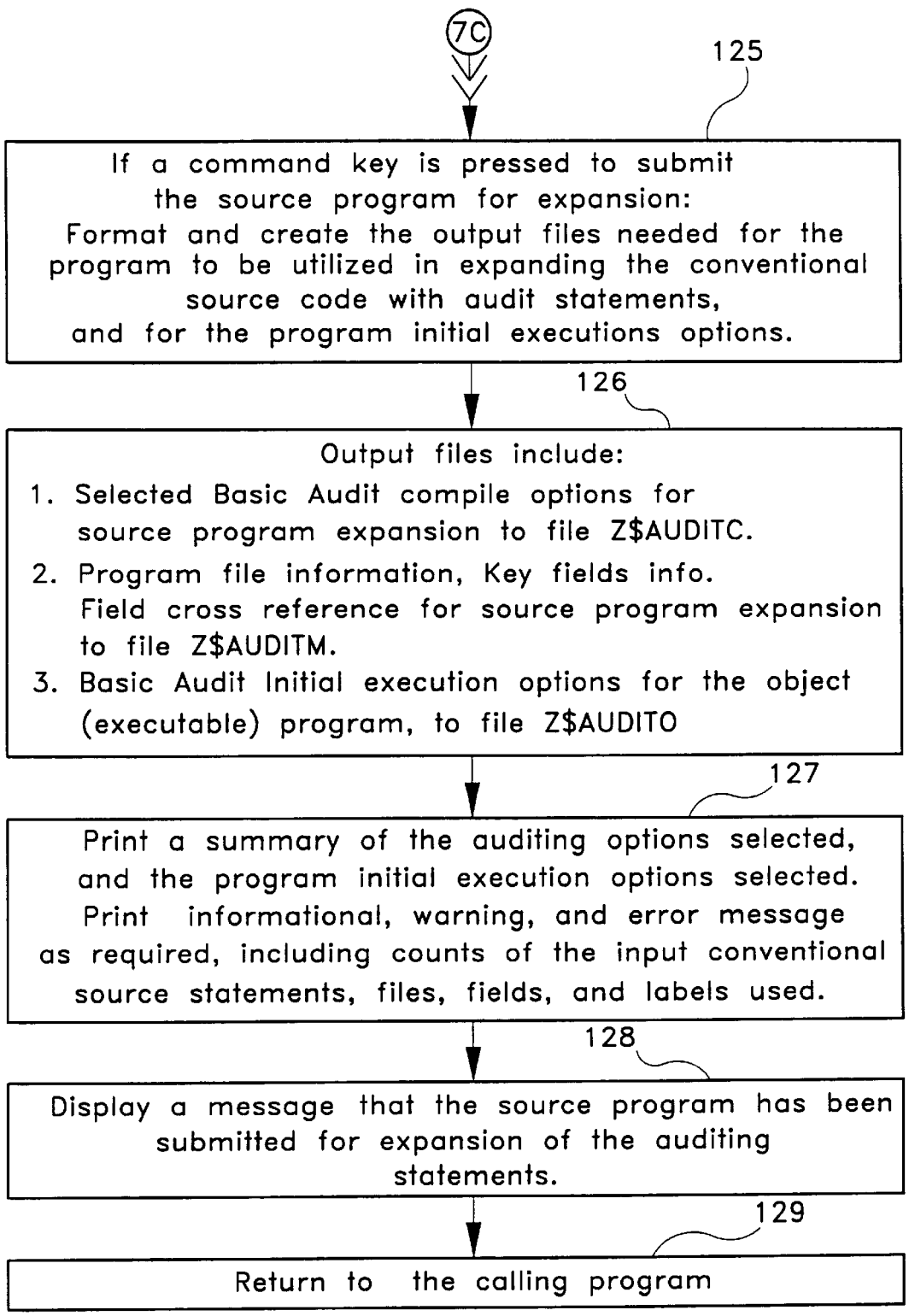
FIG. 8 is a flowchart of the pseudo-code for the create or change compile and initial execution audit options program (Z$PGM01).

FIG. 8 shows the output for the create or change compile and initial execution audit options program 100. Upon pressing a command key to submit the source program for expansion, step 125 formats and creates the output files required for the program to be utilized in expanding the conventional source code with audit statements. As shown in step 126, the output files which are produced include selected basic audit compile options for source program expansion to the selected compile audit options file 22, program file information, key fields information and field cross reference for source program expansion to the program file and field information file 24, and basic audit initial execution options for the object (executable) program to the initial execution audit options for program file 26. Step 127 prints a summary of the audit options, the program's initial execution options, informational messages, warning messages, error messages, counts of the input conventional source statements, files, fields, and labels used. Step 128 displays a message that the source program has been submitted for expansion of the auditing statements. The last step 129 returns to the calling program.

The steps required to create or change compile and initial execution audit options are complete. The create or change compile and initial execution audit options program 100 has been executed fully.

Figure 9C:
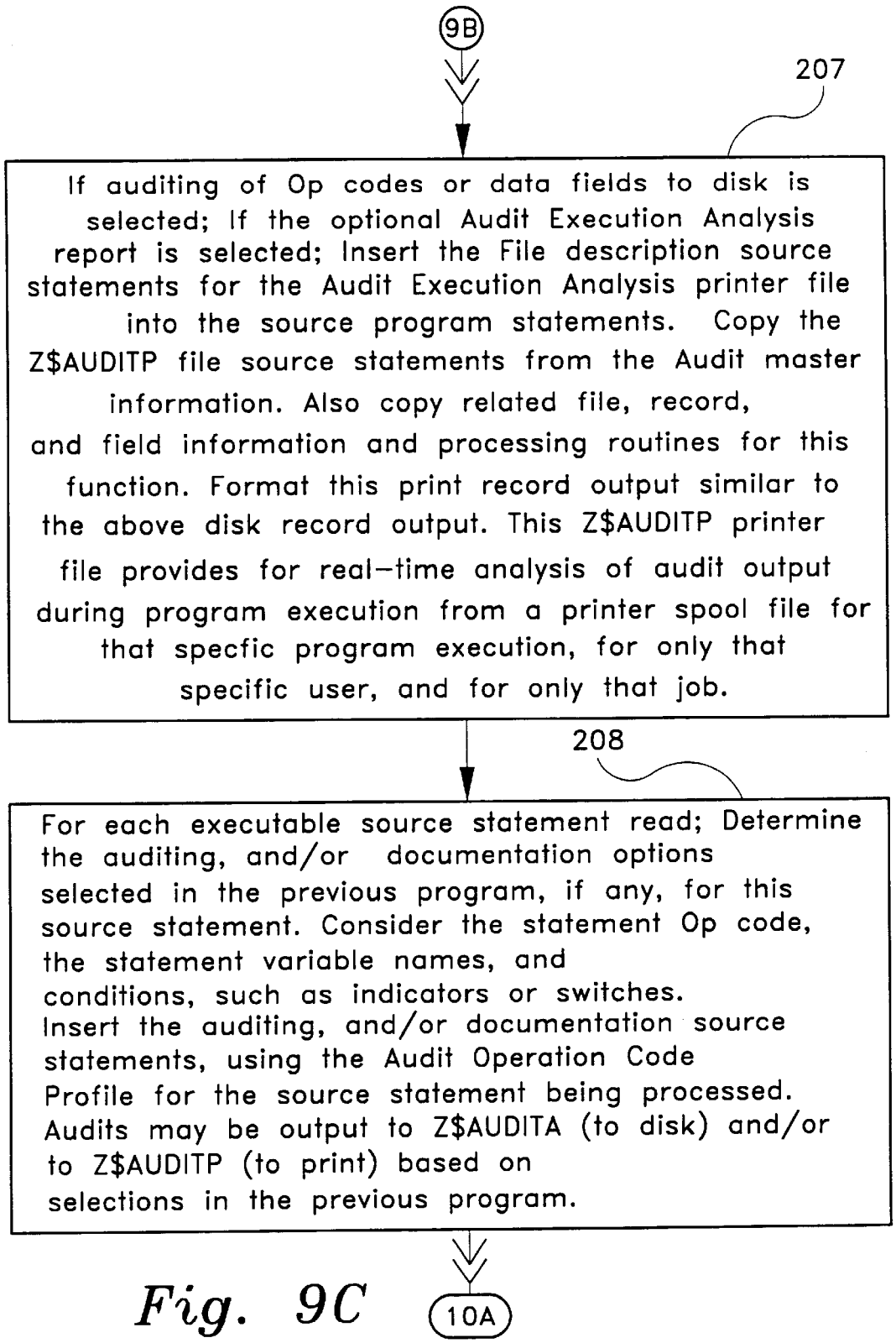
FIG. 9C is a portion of the flowchart of the pseudo-code for the expand source program with audit statements program (Z$PGM02).

The flowchart for the pseudo-code for the expand input with audits program, the pre-compiler 200 program (Z$PGM02), is shown in FIGS. 9A, 9B, 9C, 10A, 10B, 10C, and 11. The first four steps 201,202,203,204 in the pre-compiler 200 program are depicted in FIG. 9A. In the first step 201, the pre-compiler 200 program reads and stores the selected audit compile options which were created by the create or change compile and initial execution audit options program 100. Additional information for the expansion of the conventional source program is stored in the operation code audit profile and master information files 21. In the next step 202, the pre-compiler 200 program reads and stores the program file information, the key fields information, and the field cross reference information that were created by the create or change compile and initial execution audit options program 100. In step 203, the pre-compiler 200 program reads the conventional (existing) source statements for the program from the conventional source program 27 library, and in a single pass of the conventional source program statements, expands the source by inserting the basic audit source statements and expanded documentation statements. In step 204 the pre-compiler 200 determines if expanded documentation is selected. For each file used, comment lines are created with the full file name and a list of the file field names used in the file key. Auditing may be limited to only expanded source program documentation.

FIG. 9B shows the auditing to disk selections 205, 206 for the pre-compiler 200 program. If the programmer has selected the option 205 to audit operation codes or data fields to disk, then the programmer must insert the File description source statements for the audit execution output file 42 into the source program statements. Audit execution output file 42 source statements are copied from the audit master information. Related files, records, fields, and standard processing routines for this function are also copied. All audit disk output will be written to the audit execution output file 42 disk. Alternatively, the programmer may select option 206, to effect the basic auditing of operation codes or data fields to disk. In this case, the programmer must insert the file description source statements for the audit execution output file 42 into the source program statements. The program copies the current execution audit options file 43 source statements from the audit master information. Also, the program copies related file, record, field and standard processing routines for this function. The current execution audit options file 43 is the audit execution options disk files which controls which of the audit options are active during program execution.

As shown in FIG. 9C, if the programmer has selected option 205 to audit operation codes or data fields to disk, and then selects option 207, the programmer inserts the file description source statements for the audit execution analysis printer file into the source program statements. The program copies the audit execution analysis report 49 file source statements from the audit master information and copies related files, records, field information, and processing routines for this function. This print record output is formatted in a manner similar to the previous disk record output. The audit execution analysis report 49 printer file provides real-time analysis of audit output during program execution from a printer spool file. This output is for that specific program execution, for only that specific user, and for only that job. In step 208, the auditing and/or documentation options selected in the previous program, the create or change compile and initial execution audit options program 100, for each executable source statement read are determined. This determination involves consideration of the statement operation code, the statement variable names, and the conditions, such as indicators or switches. The auditing and/or documentation source statements are inserted using the audit operation code profile for the source statements being processed. The resulting audits may be output to disk via the audit analysis reporting options 53 file and/or to a printer via the audit analysis reporting 57 program based on selections in the create or change compile and initial execution audit options program 100.

The flowchart of the pseudo-code for the expand input with audits program, the pre-compiler, is continued in FIG. 10A. As shown in step 209, a unique audit name for the audited source statement is generated for each source statement to be expanded with audit statements. In assigning a unique audit name, the assigned three character audit prefix code for the operation code from the create or change compile and initial execution audit options program 100 is utilized. The audit prefix code is suffixed with a three digit sequential number each time the operation code is used in the source program. This method results in a unique identifier for every source statement audited during the execution of the program and the audited variable names identify the data being processed. As shown in step 210, changes to the conventional (existing) source statements can occur only if a branch is made to a statement label, and auditing is selected to audit the branch to that label, which results in an audit statement that is inserted at the label statement. These changes are normally made only to the copies of the expanded source program.

Figure 10B:
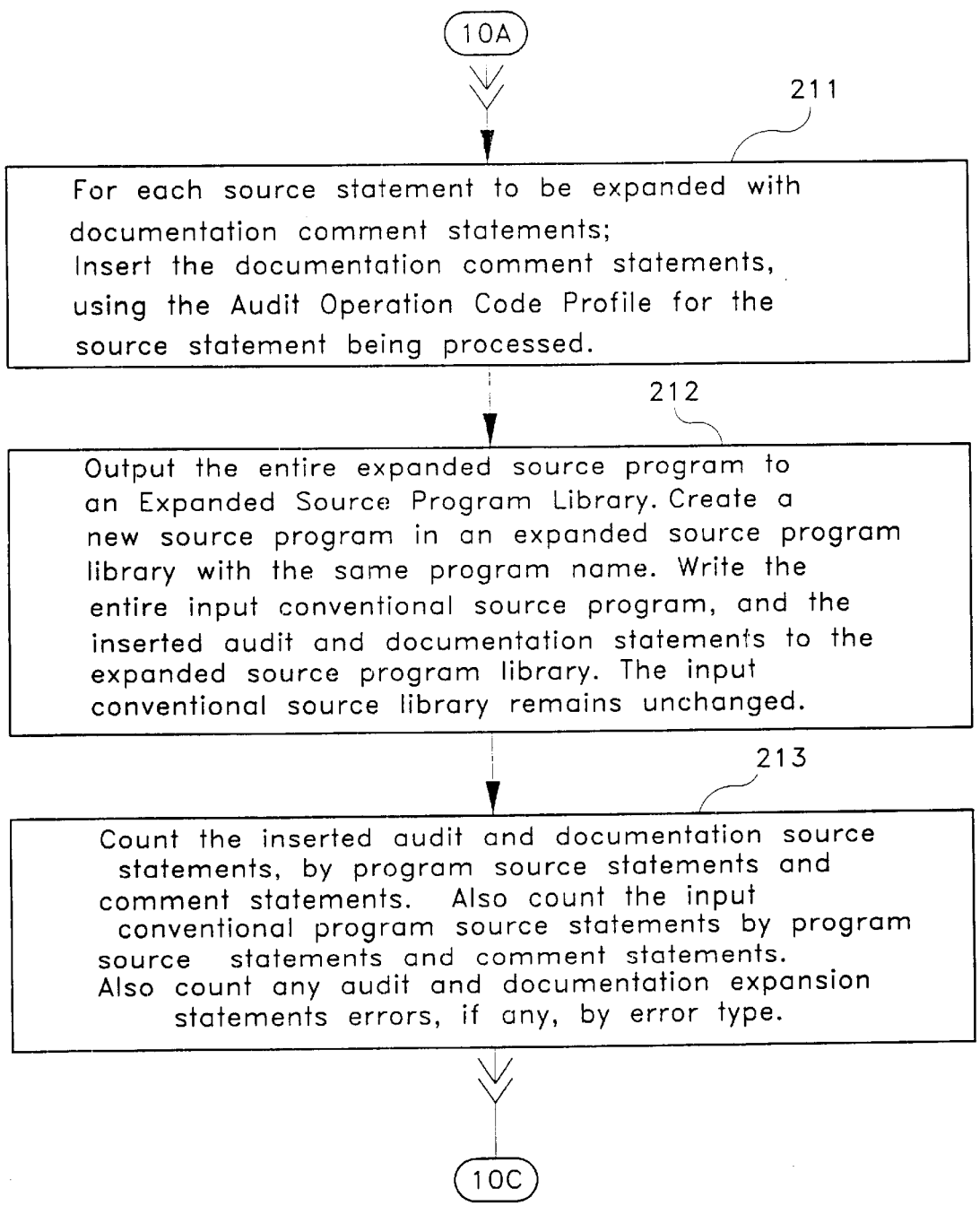
FIG. 10B is a portion of the flowchart of the pseudo-code for the expand source program with audit statements program (Z$PGM02).

The flowchart of the pseudo-code for the expanded input with audits program, the pre-compiler 200 program, is continued in FIG. 10B. In step 211, the audit operation code profile for the source statement being processed inserts documentation comment statements for each source statement expanded. In step 212, the entire expanded source program results are output to an expanded source program library. A new source program is created in an expanded source program library with the same program name. The entire input conventional source program is written to the expanded source program library including the inserted audit and documentation statements. The input conventional source library remains unchanged. In step 213, the inserted audit and documentation source statements and the input of conventional program source statements are counted by program source statements and comment statements. Also, audit and documentation expansion statement errors, if any, are counted by error types.

Figure 10C:
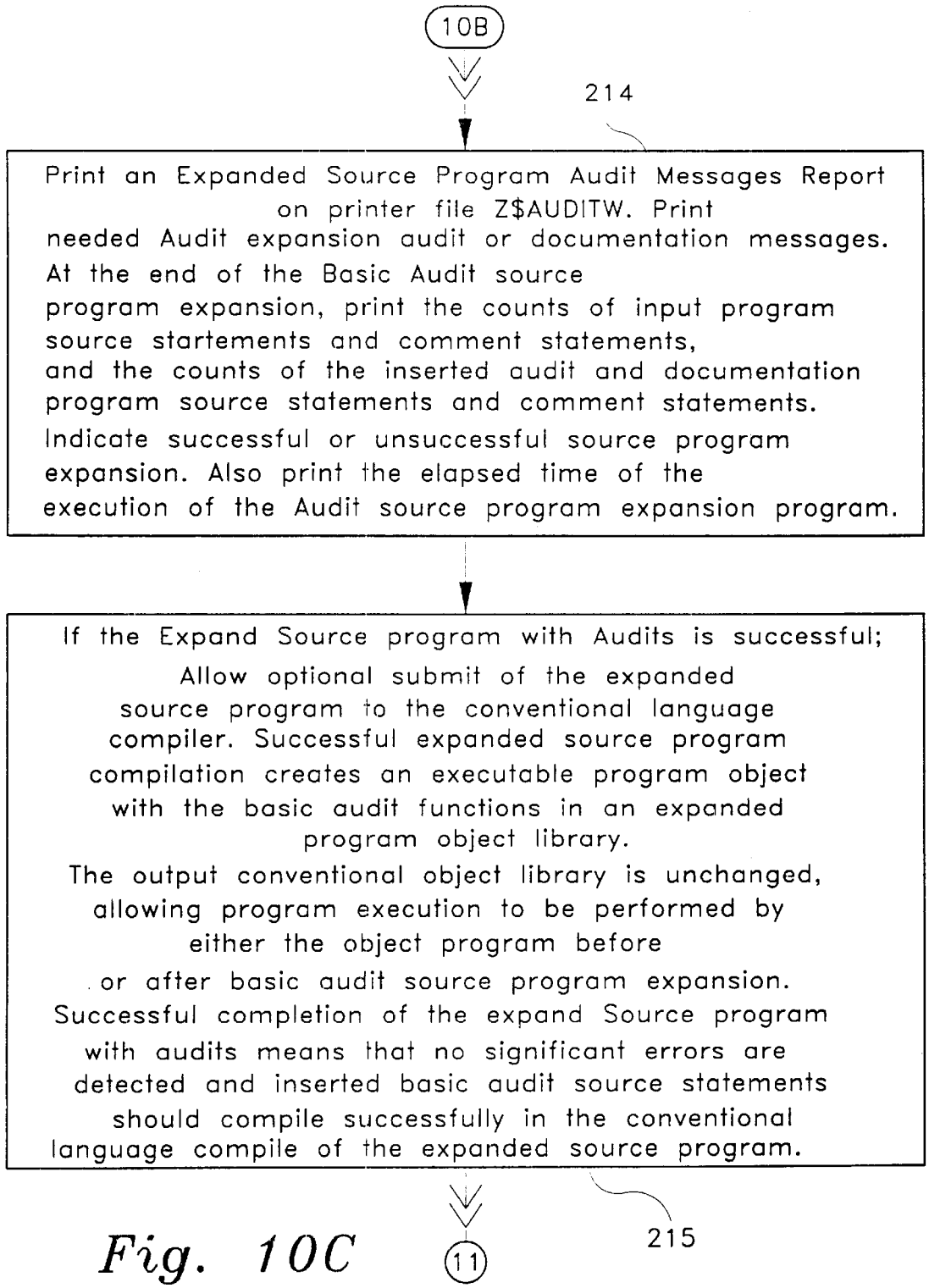
FIG. 10C is a portion of the flowchart of the pseudo-code for the expand source program with audit statements program (Z$PGM02).

The flowchart of the pseudo-code for the expand input with audits program, the pre-compiler 200 program, is continued in FIG. 10C. In step 214, the expanded source program audit messages 31 printer file is utilized to print an expanded source program audit messages report. Needed audit expansion or documentation messages may then be printed. The counts of input program source statements and comment statements, and the counts of the inserted audit and documentation program source and comment statements are printed at the end of the basic audit source program expansion. The elapsed time of the execution of the audit source program expansion program is also printed.

In step 215, if the expand source program with audits is successful, then the expanded source program is allowed to be submitted to the conventional -programming language source program compiler 37. An executable program object with the basic audit functions in an expanded program object library is created by successful expanded source program compilation. The output conventional object library remains unchanged, which allows program execution to be performed by the object program either before or after basic audit source program expansion. Successful completion of the expand source program with audits means that no significant errors are detected, and inserted basic audit source statements should compile successfully in the conventional language compile of the expanded source program.

Figure 11:
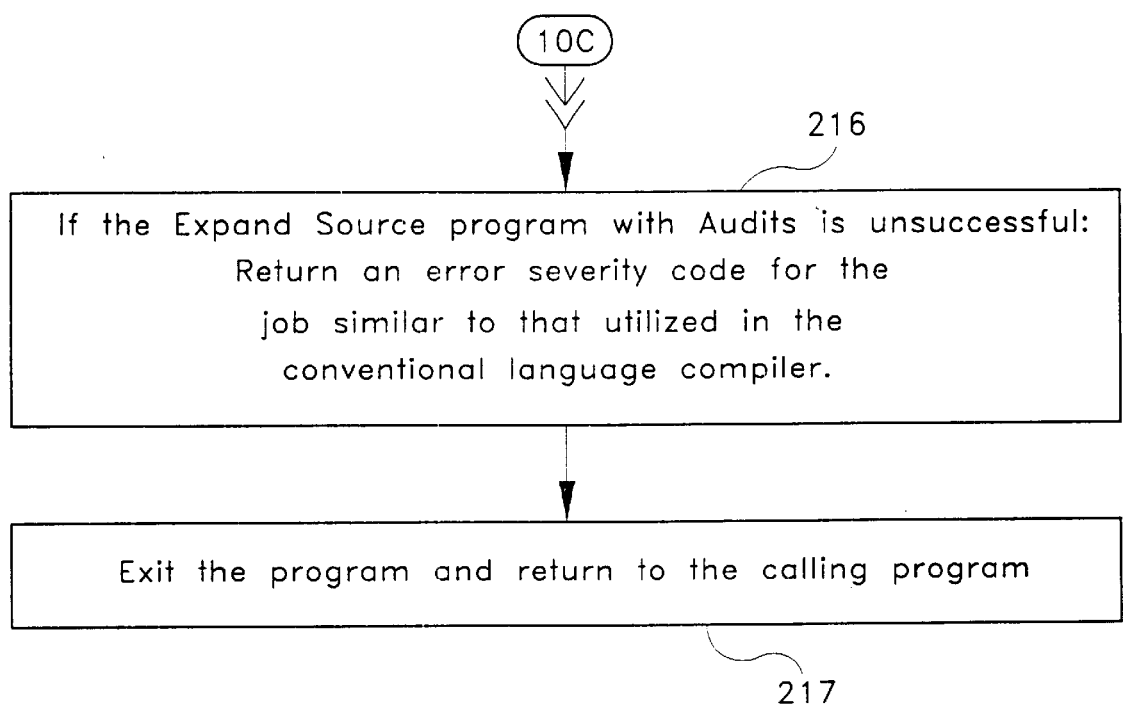
FIG. 11 is a portion of the flowchart of the pseudo-code for the expand source program with audit statements program (Z$PGM02).

The flowchart of the pseudo-code for the expand input with audits program, the pre-compiler 200 program, is continued in FIG. 11. In step 216, in the event that the expanded source program with audits is unsuccessful, then an error severity code is returned. The error severity code for the job is similar to the error severity code returned by conventional language compilers. In step 217, once the pre-compiler 200 program is finished, the program is exited and returned to the calling program.

Figure 12A:
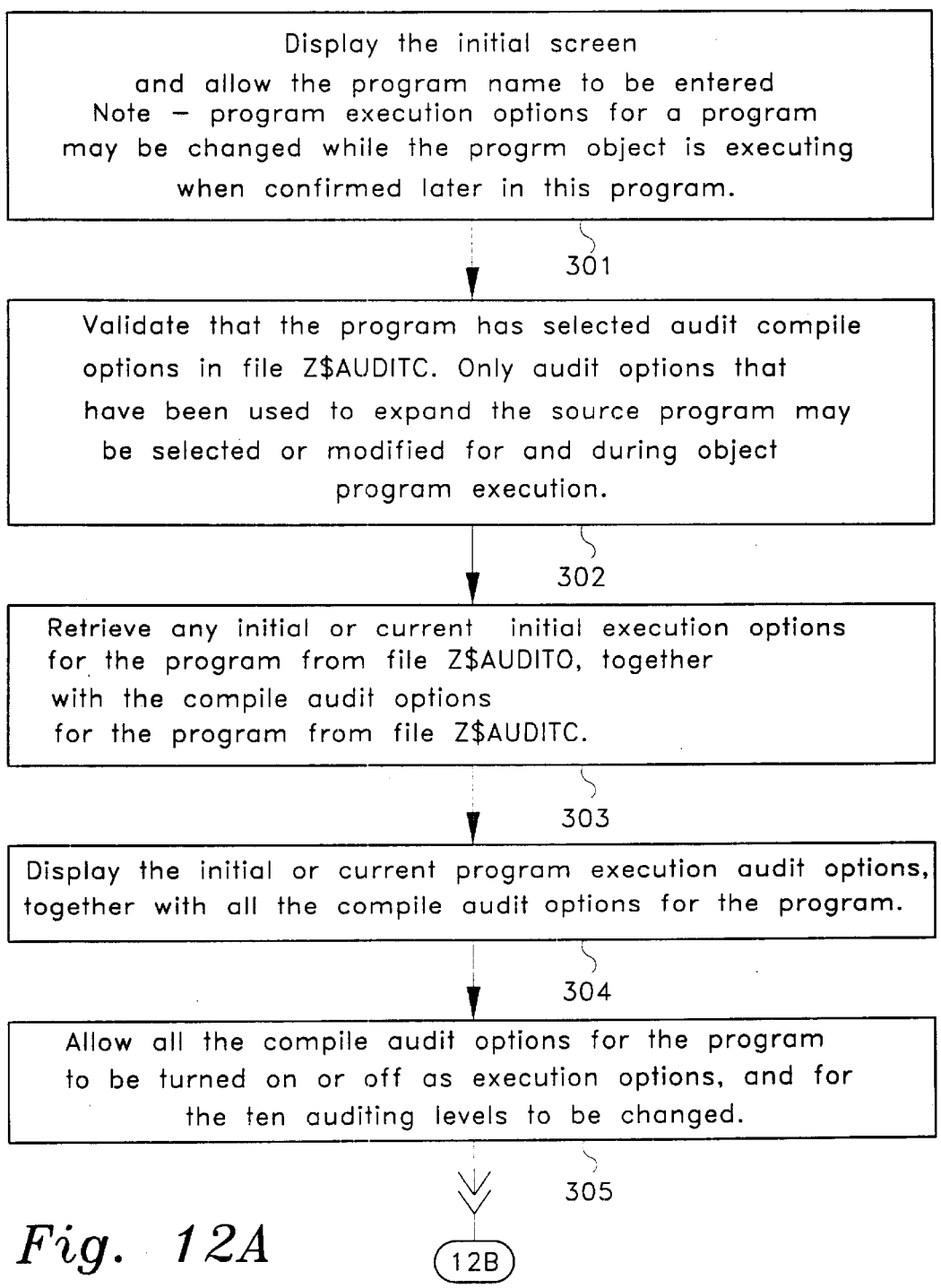
FIG. 12A is a portion of the flowchart of the pseudo-code for the modify the initial execution audit options program (Z$PGM03).
Figure 12B:
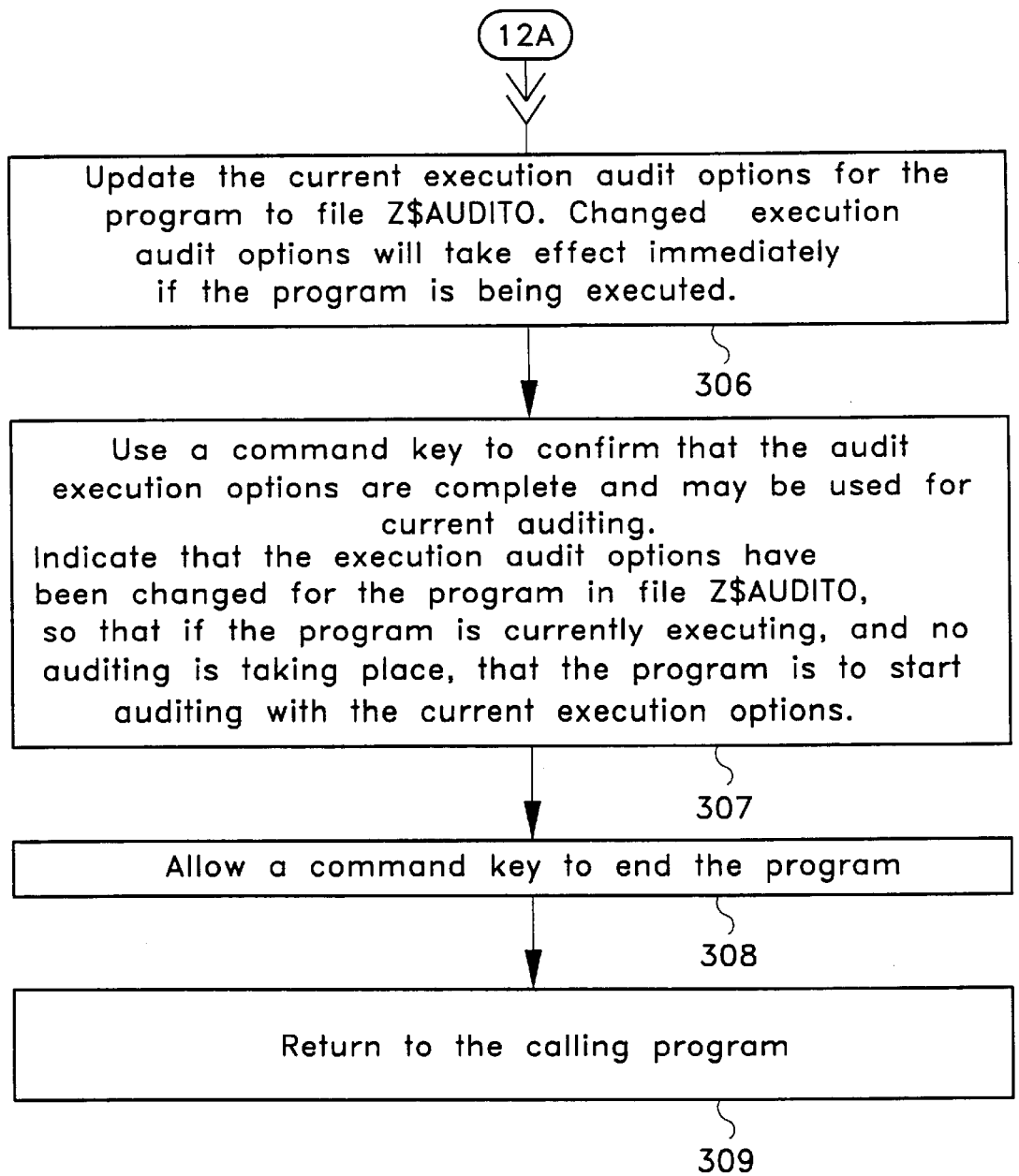
FIG. 12B is a portion of the flowchart of the pseudo-code for the modify the initial execution audit options program (Z$PGM03).

The flowchart of the pseudo-code for the modify the initial execution audit options program 300 (Z$PGM03) is depicted in FIGS. 12A and 12B. The modify initial execution audit options program 300 is the program that allows the dynamic modification of the auditing options. The first step 301 is to input the name of the conventional source program 27 by entering the name when prompted by the initial display screen, the modify initial execution audit options for program 41. It is important to note that the program execution options for a program may be changed while the program object is executing when confirmed later during the execution of modify initial execution audit options program 300. Step 302 requires the programmer to validate that the modify initial execution audit options program 300 has selected the audit compile options in the selected compile audit options file 22. Only those audit options which have been used to expand the source program may be selected or modified for and during object program execution. Step 303 retrieves any initial or current initial execution options for the program from the initial execution options for program file 26 (Z$AUDITO), together with the compile audit options for the program from the selected compile audit options file 22 (Z$AUDITC). Step 304 displays the initial or current program execution audit options and all of the compile audit options are displayed. Step 305 allows all the compile options to be turned on or off as execution options, and allows for the ten auditing levels to be changed.

Step 306 causes the current execution audit options for the program to be updated to the current execution audit options file 43 (Z$AUDITO). The changed execution audit options will take effect immediately if the program is being executed. Step 307 enables a command key to be used to confirm that the audit execution options are complete and may be used for current auditing. It is indicated that the execution audit options have been changed for the program in the current execution audit options file 43 (Z$AUDITO), so that if the program is currently executing, and no auditing is taking place, the program is to start auditing with the current execution options. In step 308, a command key is used to end the modify initial execution audit options program 300. In step 309, the calling program is returned to once the modify initial execution audit options program 300 ends.

Figure 13A:
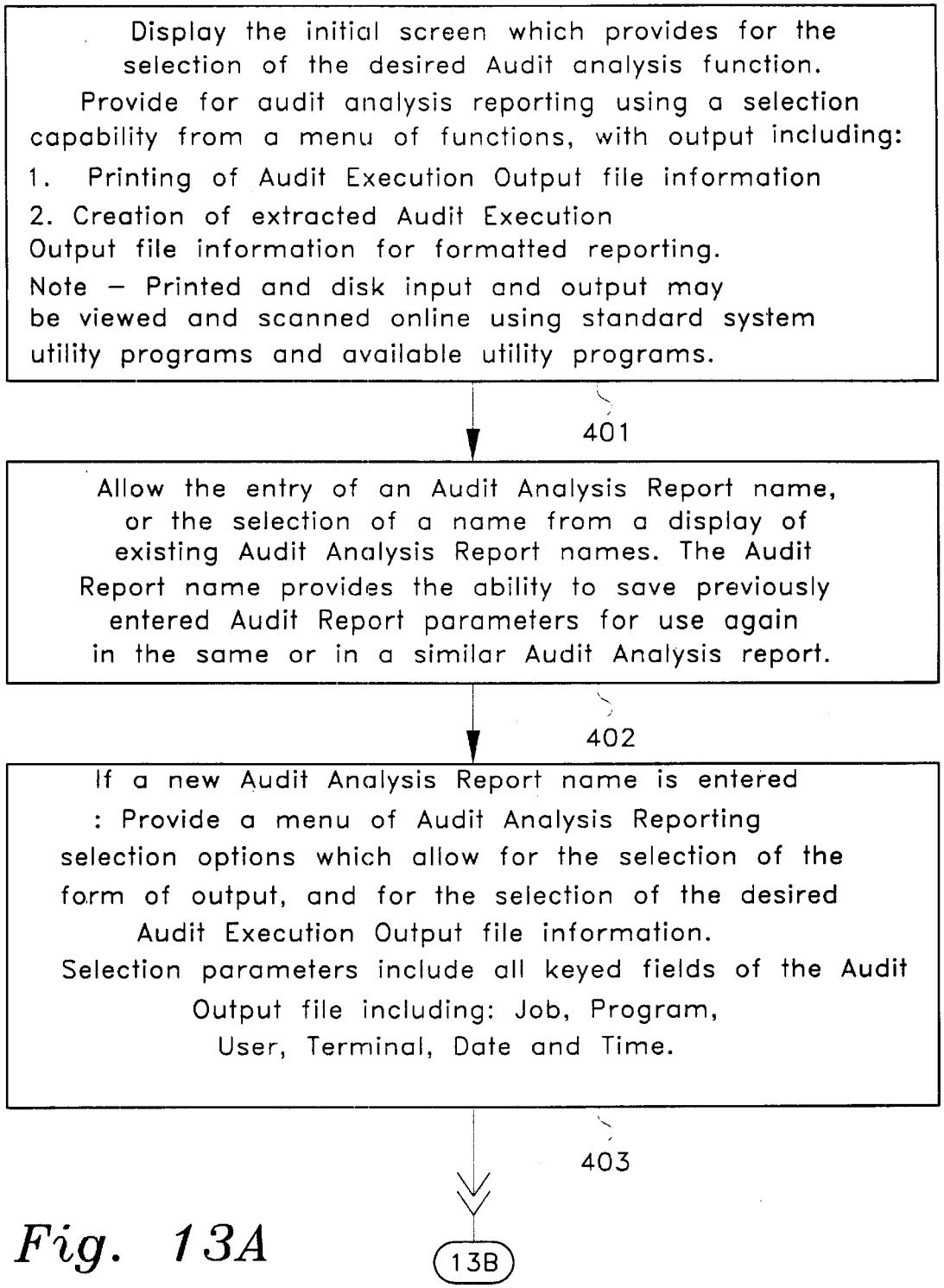
FIG. 13A is a portion of the flowchart of the pseudo-code for the create or change options and run the audit analysis reporting program (Z$PGM04).
Figure 13B:
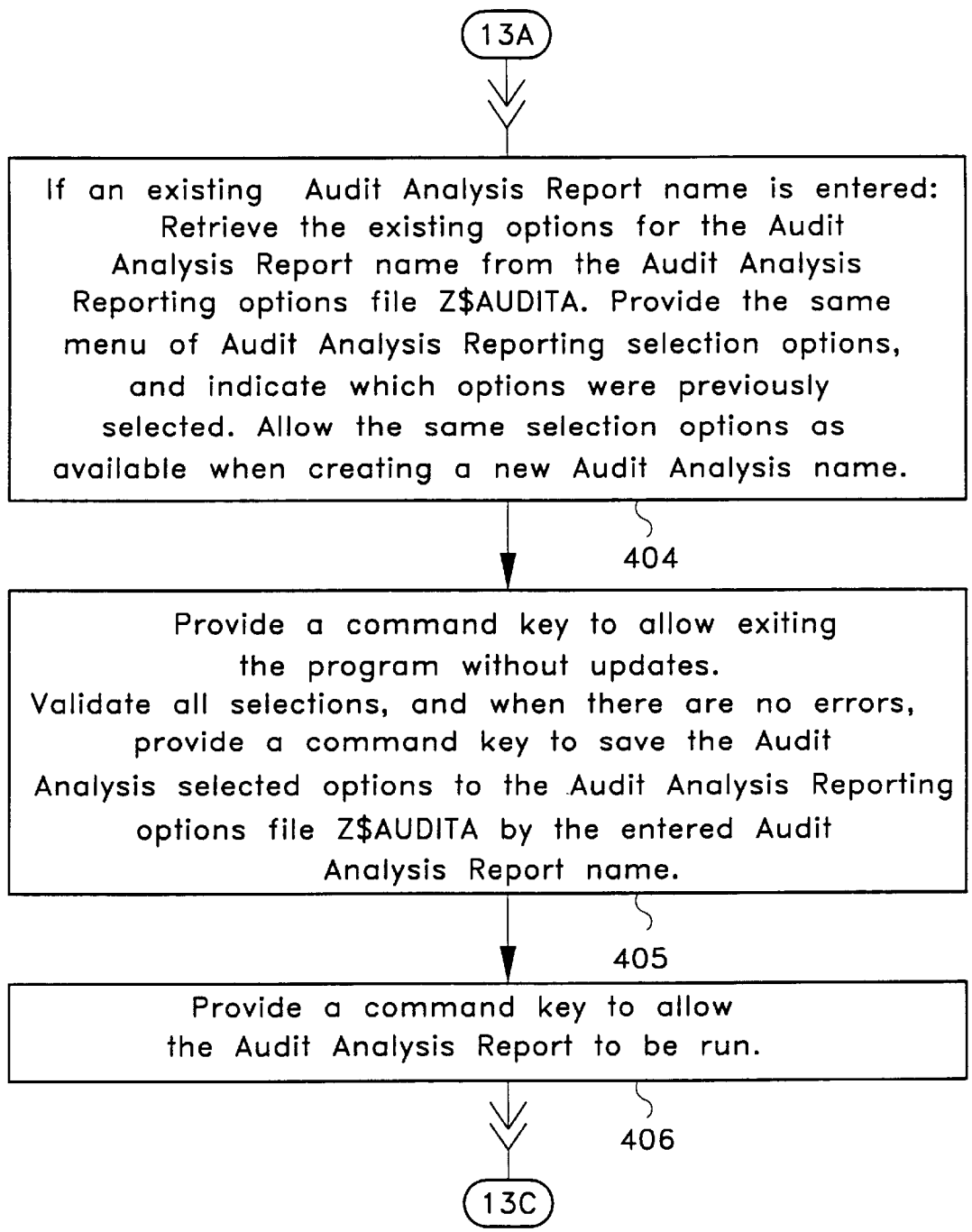
FIG. 13B is a portion of the flowchart of the pseudo-code for the create or change options and run the audit analysis reporting program (Z$PGM04).
Figure 13C:
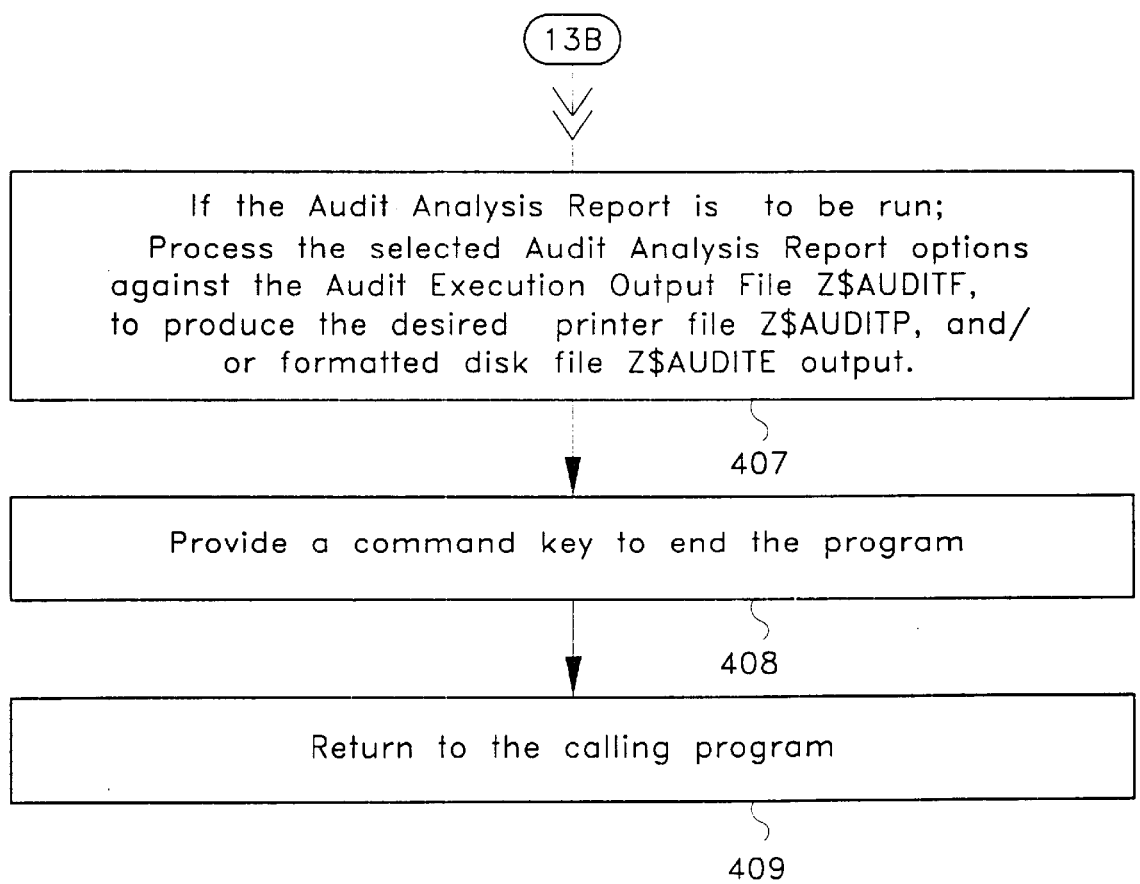
FIG. 13C is a portion of the flowchart of the pseudo-code for the create or change options and run the audit analysis reporting program (Z$PGM04).

FIGS. 13A, 13B, and 13C are a flowchart of the pseudo-code for the create or change options and run audit analysis reporting program 400 (Z$PGM04). In step 401 the initial screen is displayed. This display or print execution audit analysis 51 screen display provides for the selection of the desired audit analysis function. Audit analysis reporting is provided for using a selection capability from a menu of functions. Output provided, by the selection includes printing of audit execution output file information and creation of extracted audit execution output file information for formatted reporting. The printed and disk input and output may be viewed and scanned online using standard system utility programs and available utility programs. An option 402 is provided which allows for the entry of an audit analysis report name or the selection of a name from a display of existing audit analysis report names. The audit report name provides the ability to save previously entered audit report parameters for use again in the same, or a similar, audit analysis report. In step 403, when a new audit analysis report name is entered, a menu for audit analysis reporting selection options which allows the selection of the form of output is provided. The selection of the desired audit execution output file information is also provided. Selection parameters include all keyed fields of the audit output file including Job, Program, User, Terminal, Date, and Time.

As shown in step 404, when an existing audit analysis report name is entered, the create or change options and run audit analysis reporting program 400 retrieves the existing options for the audit analysis report name from the analysis reporting options file 53. The same menu of audit analysis reporting selection options is provided and indicates which options were previously selected. The same selection options that were available when creating a new audit analysis name are allowed. Step 405 provides a command key which allows exiting the program without updates. All selections are validated and, when there are no errors, a command key to save the audit analysis selected options to the analysis reporting options file 53 is provided by the entered audit analysis report name. Step 406 provides a command key is provided to allow the audit analysis report to be run.

As shown in step 407, if the audit analysis report is to be run, the selected audit analysis report options are processed against the audit execution output file 42 (Z$AUDITF) to produce the desired printer file (Z$AUDITP), and/or the formatted disk file (Z$AUDITE) output. Step 408 provides a command key to end the program, and step 409 returns to the calling program.

Figure 14A:
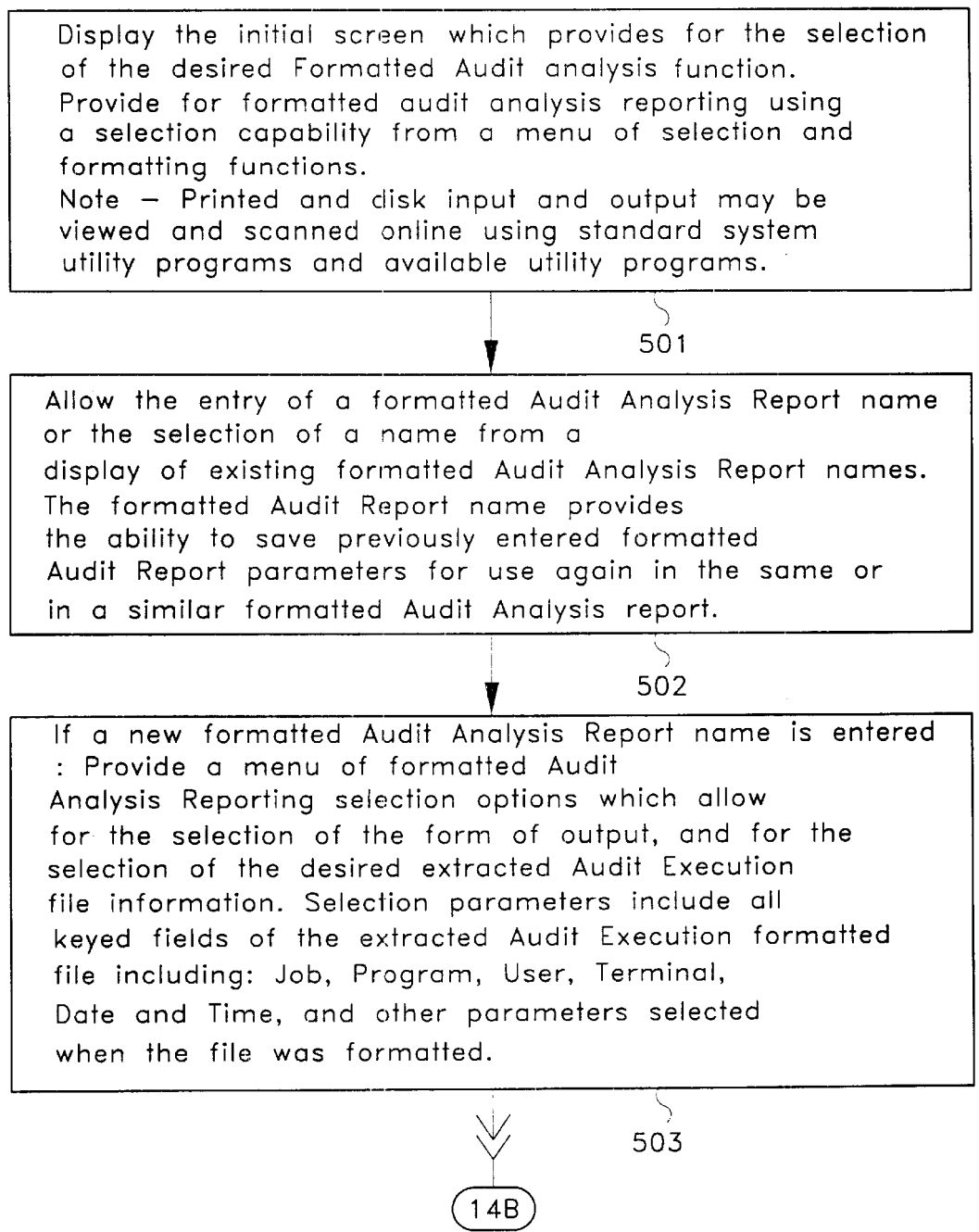
FIG. 14A is a portion of the flowchart of the pseudo-code for the create or change options and run the formatted audit analysis reporting program (Z$PGM05).
Figure 14B:
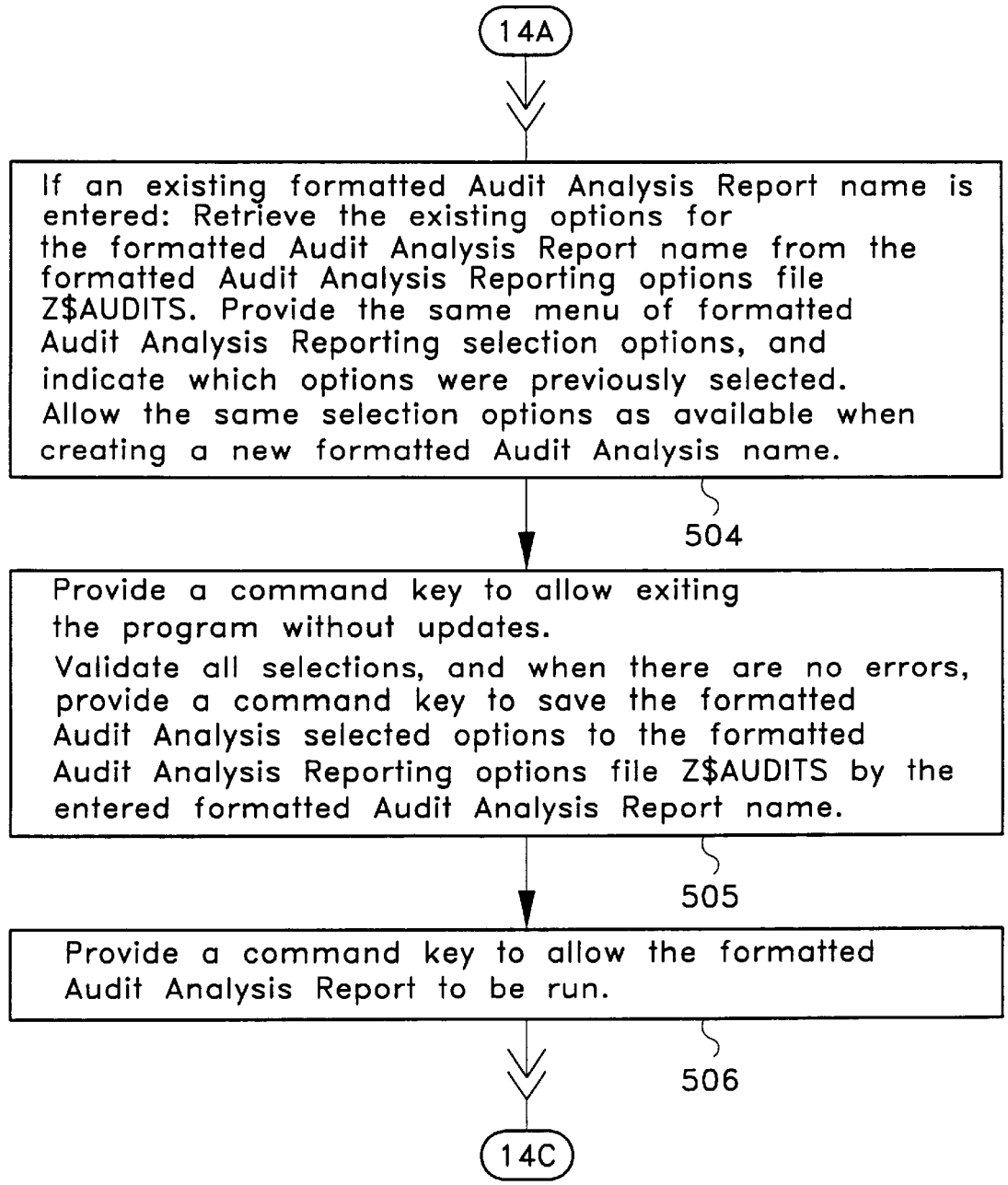
FIG. 14B is a portion of the flowchart of the pseudo-code for the create or change options and run the formatted audit analysis reporting program (Z$PGM05).
Figure 14C:
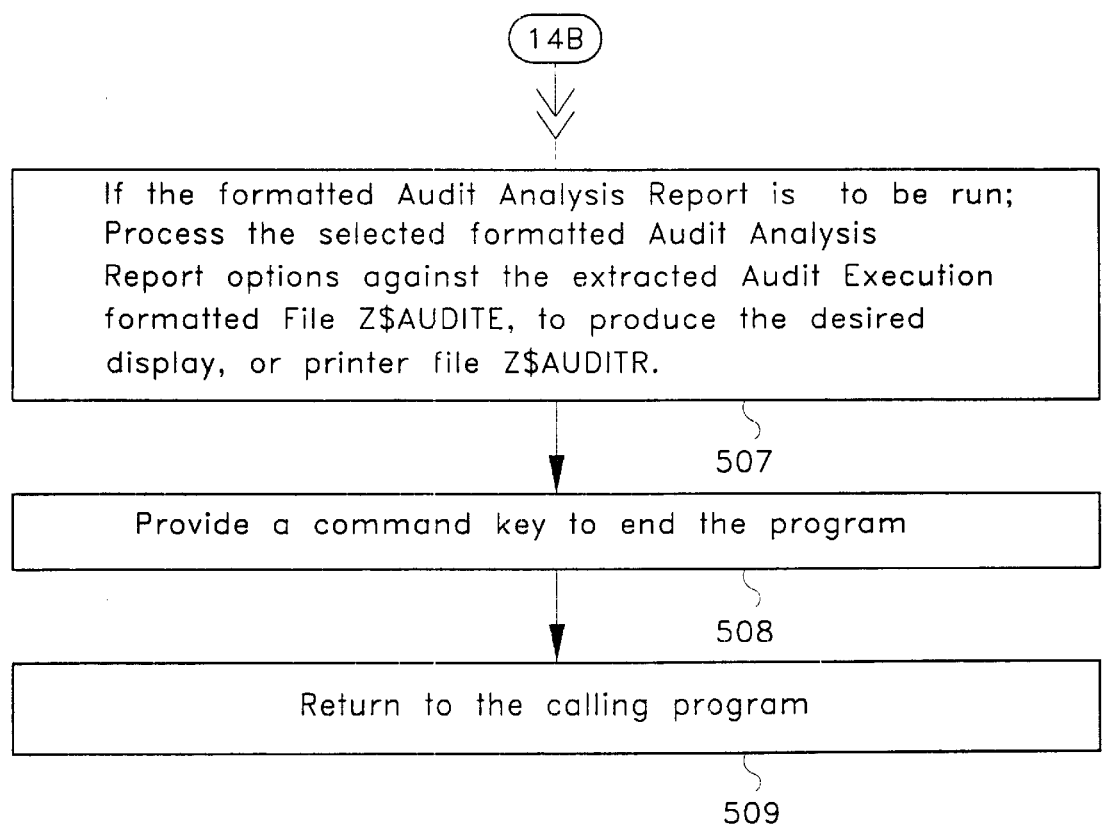
FIG. 14C is a portion of the flowchart of the pseudo-code for the create or change options and run the formatted audit analysis reporting program (Z$PGM05).

FIGS. 14A, 14B, and 14C are a flowchart of the pseudo-code for the create or change options and run formatted audit analysis reporting program 500 (Z$PGM05). In step 501, the initial screen is displayed providing for the selection of the desired formatted audit analysis functions. The formatted audit analysis reporting using a selection capability from a menu of selection and formatting functions is provided. It is important to note that printed and disk input and output may be viewed and scanned online using standard system utility programs and available utility programs. In step 502, the entry of a formatted audit analysis report name or the selection of a name from a display of existing formatted audit analysis report names is allowed. The formatted audit report name provides the ability to save previously entered formatted audit report parameters for use again in the same or similar formatted audit analysis report. In step 503, if a new formatted audit analysis report name is entered, a menu of formatted audit analysis reporting selection options is provided which allows for the selection of the form of output and for the selection for the desired extracted audit execution file information. The selection parameters include all keyed fields of the extracted audit execution formatted file including Job, Program, User, Terminal, Date, Time, and other parameters selected when the file was formatted.

In step 504, if an existing formatted audit analysis report name is entered, the existing options for the formatted audit analysis report name are retrieved from the formatted audit analysis reporting options file 63. The same menu of formatted audit analysis reporting selection options are provided and the options which were previously selected are indicated. The same selection options that were available when creating a new formatted audit analysis name are allowed. In step 505 a command key is provided to allow exiting the program without updates, all selections are validated, and when there are no errors, another command key is provided to save the formatted audit analysis selected options to the formatted audit analysis reporting options file 63 (Z$AUDITS) by the entered formatted audit analysis report name. Step 506 provides a command key to allow the formatted audit analysis report to be run.

In step 507, if the formatted audit analysis report is to be run, then the selected formatted audit analysis report options are processed against the extracted audit execution formatted file (Z$AUDITE) to produce the desired display or printer file (Z$AUDITR) of the formatted audit analysis reporting 65. Step 508 provides a command key is provided to end the program and step 509 returns to the calling program.

Figure 15B:
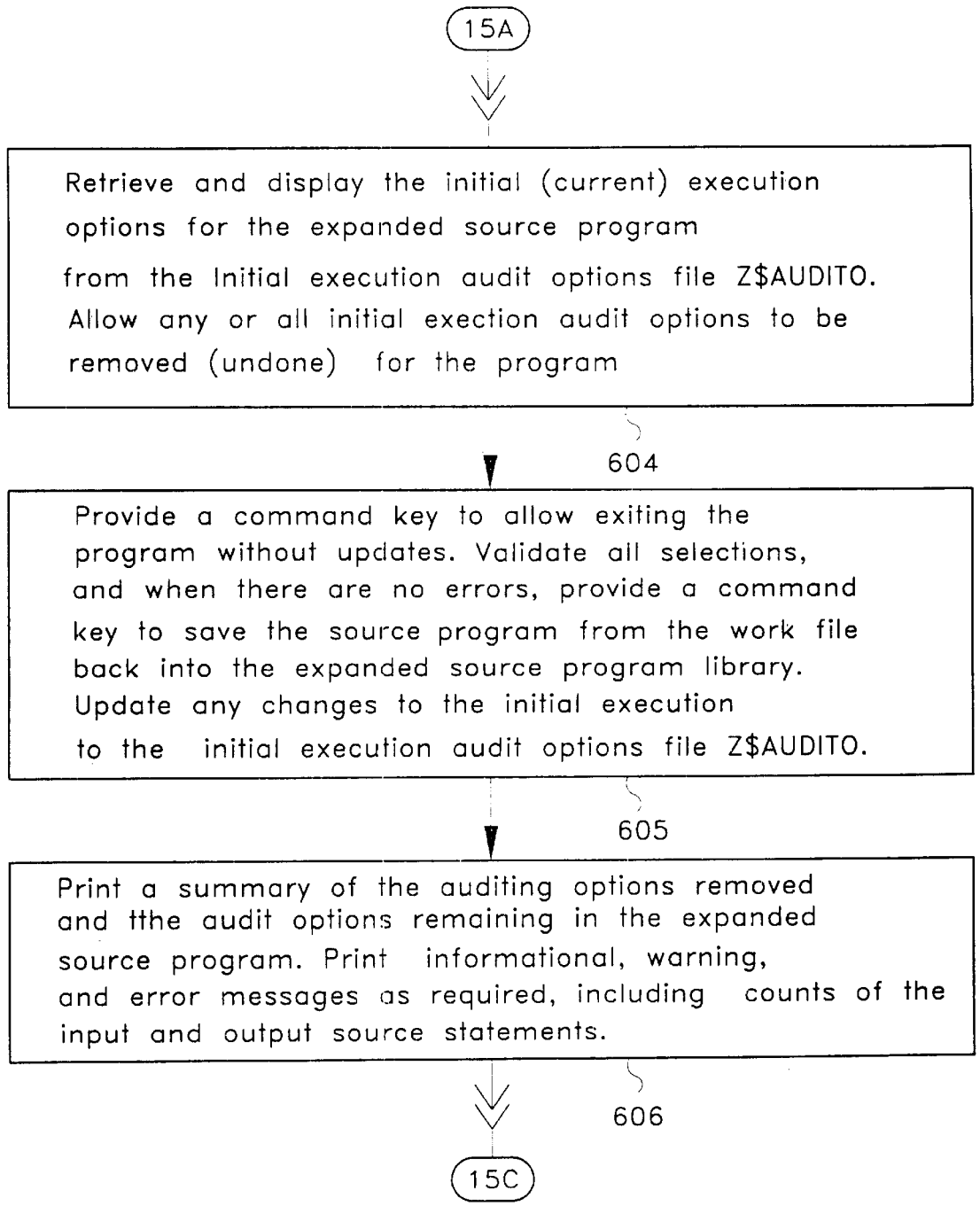
FIG. 15B is a portion of the flowchart of the pseudo-code for the modify source program compile and initial execution audit options program (Z$PGM06).
Figure 15C:
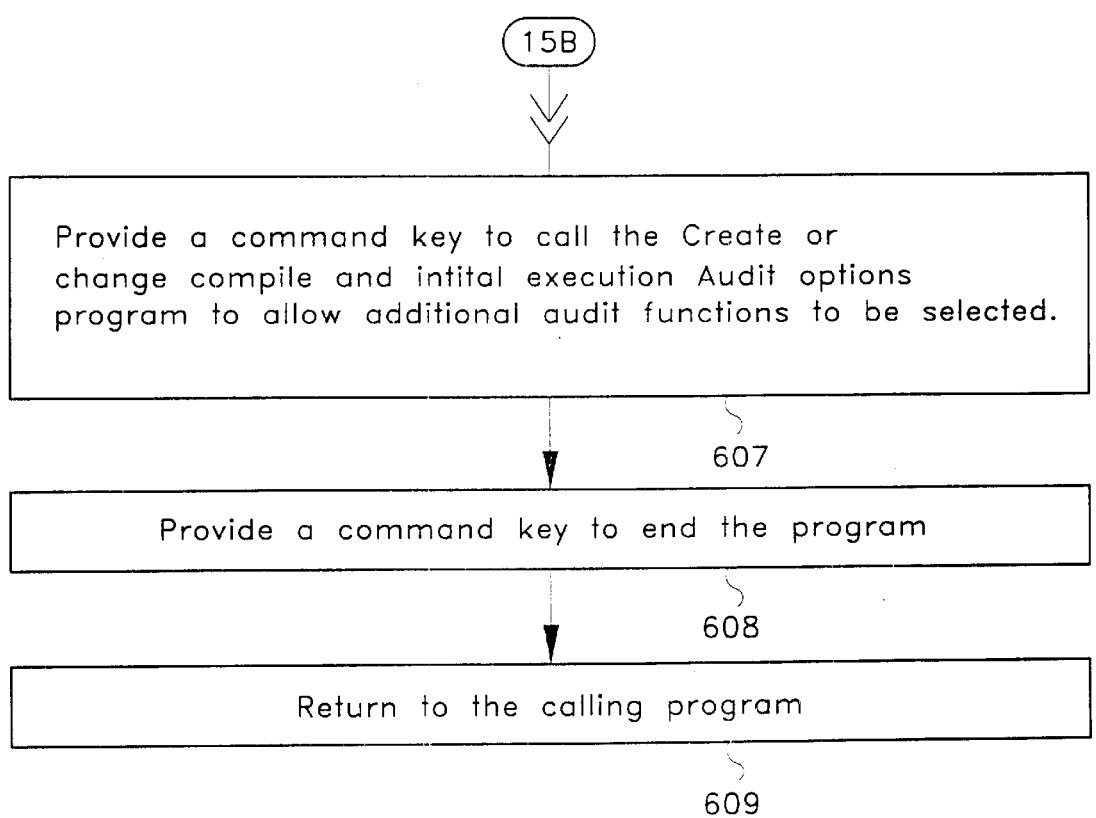
FIG. 15C is a portion of the flowchart of the pseudo-code for the modify source program compile and initial execution audit options program (Z$PGM06).

FIGS. 15A, 15B, and 15C are a flowchart of the pseudo-code for the modify compile and initial execution audit options program 600. In step 601, the initial screen is displayed and the program allows a name to be entered. This program is utilized to input previously expanded source programs and to allow the removal of all or selected audit source statements. This allows the complete undoing of the expanded source audit statements back to the original conventional input source program, or the partial undoing of the expanded source audit statements. The program may then be expanded with additional audit statements. In step 602, the expanded source program is retrieved from the expanded source program library into a work file, the source program is scanned for all audit statements, and the audit functions are summarized in the same display as used in the create or change compile and initial execution audit options program. In step 603, the audit functions in the expanded source program are displayed, and any or all of the audit functions are allowed to be removed from the work file of the input expanded source program.

In step 604, the initial (current) execution options are retrieved and displayed for the expanded source program from the initial execution audit options file 26 (Z$AUDITO). Any or all of the initial execution audit options are allowed to be removed (undone). Step 605 provides a command key to allow exiting the program without updates, all selections are validated, and when there are no errors, a command key is provided to save the source program from the work file back into the expanded source program library. Any changes to the initial execution is updated to the initial execution audit options for program file 26. Step 606 produces a variety of printouts. A summary of the auditing options removed and the audit options remaining in the expanded source program are printed.

Informational, warning, and error messages are printed as required, including counts of the input and output source statements.

Step 607 provides a command key to call the create or change compile and initial execution audit options program to allow additional audit functions to be selected. Step 608 provides a command key to end the program, and step 609 returns to the calling program.

The microfiche appendix shows four IBM AS/400 RPG source programs of the software according to a preferred embodiment. The microfiche appendix includes programs Z$PGM01D, Z$PGM01R, Z$PGM02R, and Z$PGM04R written in IBM AS/400 RPG III. Program Z$PGM01D generates a user-friendly display screen for a user. Program Z$PGM01R allows a programmer to quickly and easily audit and document a conventional source program, or select additional audits for a previously expanded source program. This program is a setup program for the expand input and audits program Z$PGM02R. Program Z$PGM02R is the expand input and audits program which is the primary program which expands the input conventional source program with the audit statements based on the options selected. Program Z$PGM04R creates cross reference information needed for the expand input with audits program.

It is to be understood that the present invention is not limited to the embodiments described above, but encompasses any and all embodiments within the scope of the following claims.

I claim:

1. An automated computer-implemented method for generating an audit record of a computer program while the computer program is executing, said computer program having an original source program comprising a plurality of source statements written in a predetermined source language, the method comprising the steps of:

selecting an audit profile, the audit profile being defined by at least one field name;

examining each one of the source statements for the presence of the at least one field name;

creating an audit statement in the source language of the computer program corresponding to each one of the source statements in which the at least one field name is present;

inserting each created audit statement into the original source program proximate to the corresponding source statement to form an expanded source program, said audit statement being inserted prior to the corresponding source statement when the corresponding source statement is a branching statement; and compiling or interpreting said expanded source program to form an expanded computer executable program, wherein said audit statement causes said computer executable program to output the audit record, in real time, during the time that said computer executable program is executing, said audit record comprising the at least one field name and a value of the field associated with the at least one field name corresponding to each one of the source statements in which the at least one field name is present.

2. The method according to claim 1, wherein said audit profile provides for including in the audit record, the name of the at least one field and the value of the field associated with the at least one field name contained in each audited source statement.

3. The method according to claim 1, wherein a unique audit code is assigned to each source statement that is audited.

4. The method according to claim 1, wherein the at least one audit profile provides for inserting at least one documentation statement into the source program to form the expanded source program.

5. The method according to claim 4, wherein the at least one documentation statement provides for including in the audit record, at least one file description, at least one file key field name and at least one called program description.

6. The method according to claim 1, wherein the at least one audit profile provides for including in the audit record a date and a time of execution of each source statement.

7. The method according to claim 1, wherein the at least one selected audit profile may be changed while the computer program is executing.

8. The method according to claim 1, wherein the audit record is output to at least one of a storage media and a print file.

9. The method according to claim 1, wherein the at least one audit record comprises at least one of a program name, a user name, a date and a time of execution, an audit code prefix, the source statement corresponding to the audit statement and field values.

10. The method according to claim 1, wherein the at least one audit profile provides for customizing the audit record by a file name, a record format, an operation code, a field name and a program label.

11. An article of manufacture for generating an audit record of a computer program while the computer program is executing, said computer program having an original source program comprising a plurality of source statements written in a predetermined source language, the article of manufacture comprising a computer-readable medium holding computer executable instructions for performing a method comprising the steps of:

selecting an audit profile, the audit profile being defined by at least one field name;

examining each one of the source statements for the presence of the at least one field name;

creating an audit statement in the source language of the computer program corresponding to each one of the source statements in which the at least one field name is present;

inserting each created audit statement into the original source program, proximate to the corresponding source statement, to form an expanded source program, said audit statement being inserted prior to the corresponding source statement when the corresponding source statement is a branching statement; and compiling or interpreting said expanded source program to form an expanded computer executable program, wherein said audit statement causes said computer executable program to output the audit record, in real time, during the time that said computer executable program is executing, said audit record comprising the at least one field name and a value of the field associated with the at least one field name corresponding to each one of the source statements in which the at least one field name is present.

12. The article of manufacture of claim 11, wherein said audit profile provides for including in the audit record, the name of the at least one field and the value of the field associated with the at least one field name contained in each audited source statement.

13. The article of manufacture according to claim 11, wherein a unique audit code is assigned to each source statement that is audited.

14. The article of manufacture according to claim 11, further including code for inserting at least one documentation statement into the source program to form the expanded source program.

15. The article of manufacture according to claim 14, wherein the at least one documentation statement provides for including in the audit record, at least one file description, at least one file key field name and at least one called program description.

16. The article of manufacture according to claim 11, wherein the at least one audit profile provides for including in the audit record a date and a time of execution of each source statement.

17. The article of manufacture according to claim 11, wherein the at least one selected audit profile may be changed while the computer program is executing.

18. The article of manufacture according to claim 11, wherein the output of the audit record is to a storage media or to a print file.

19. The article of manufacture according to claim 11, wherein the at least one audit record comprises a least one of a program name, a user name, a date and a time of execution, an audit code prefix, the source statement corresponding to the audit statement and field values.

20. The article of manufacture according to claim 11, wherein the at least one audit profile provides for customizing the audit record by a file name, a record format, an operation code, a field name and a program label.

21. An automated computer-implemented apparatus for generating an audit record of a computer program while the computer program is executing, said computer program having an original source program comprising a plurality of source statements written in a predetermined source language and executing in the form of a computer executable program, the apparatus comprising:

means for receiving an input for selecting an audit profile for auditing the computer program, the audit profile being defined by at least one field name;

means for examining each source statement for the presence of the at least one field name;

means for creating at least one audit statement in the source language of the computer program corresponding to each one of the source statements in which the at least one field name is present in the selected at least one audit profile;

means for inserting each created at least one audit statement into the original source program proximate to the corresponding source statement to form an expanded source program, said audit statement being inserted prior to the corresponding source statement when the corresponding source statement is a branching statement; and means for compiling or interpreting said expanded source program to form an expanded computer executable program, wherein said audit statement causes said computer executable program to output the audit record, in real time, during the time that said computer executable program is executing, said audit record comprising the at least one field name and a value of the field associated with the at least one field name corresponding to each one of the source statements in which the at least one field name is present.

22. The apparatus according to claim 21, further comprising means for including in the audit record, the name of the at least one field and the value of every field associated with the at least one field name contained in each audited source statement.

23. The apparatus according to claim 21, further comprising means for assigning a unique audit code to each source statement that is audited.

24. The apparatus according to claim 21, further comprising means for inserting at least one documentation statement into the source program to form the expanded source program.

25. The apparatus according to claim 24, further comprising means for including in the audit record, at least one file description, at least one file key field name and at least one called program description.

26. The apparatus according to claim 21, further comprising means for including in the audit record a date and a time of execution of each source statement.

27. The apparatus according to claim 21, further comprising means for changing the selected audit profile while the computer program is executing.

28. The apparatus according to claim 21, further comprising means for outputting the audit record to at least one of a storage media or a print file.

29. The apparatus according to claim 21, wherein the at least one audit record comprises a least one of a program name, a user name, a date and a time of execution, an audit code prefix, the source statement corresponding to the audit statement and field values.

30. The apparatus according to claim 21, wherein the at least one audit profile provides for customizing the audit record by a file name, a record format, an operation code, a field name and a program label.

31. A method for a user to interact with a first computer program so as to generate an audit record of a second computer program, the first computer program including an audit profile for the second computer program, the method comprising the steps of:

receiving a name of the second computer program, said second computer program comprising an original source program having a plurality of source statements; and receiving a selection of a compile audit profile, wherein said compile audit profile is defined by at least one field name, said at least one audit statement being added to the source program of the second computer program proximate to a source statement of the second computer program containing the field name, said audit statement being added prior to the source statement when the source statement is a branching statement, said audit profile including a profile of substantially every operation code and file description format of the second computer program, wherein said selection of the compile audit profile causes the first computer program to create at least one audit statement in the second computer program, said at least one audit statement being in the form of a source language of the second computer program, the at least one audit statement being added to the source program of the second computer program to form an expanded source program and thereby generate the audit record of the second computer program during the time that the second computer program is executing, the audit record comprising at least one field name and a value of the field associated with the at least one field name corresponding to each one of the plurality of source statements in which the at least one field name is present.

* * * * *